United States Patent
Byrne

(10) Patent No.: US 8,480,429 B2
(45) Date of Patent: Jul. 9, 2013

(54) POWER DATA HOUSING

(71) Applicant: Norman R. Byrne, Ada, MI (US)

(72) Inventor: Norman R. Byrne, Ada, MI (US)

(*) Notice: Subject to any disclaimer, the term of this patent is extended or adjusted under 35 U.S.C. 154(b) by 0 days.

(21) Appl. No.: 13/650,661

(22) Filed: Oct. 12, 2012

(65) Prior Publication Data
US 2013/0037298 A1 Feb. 14, 2013

Related U.S. Application Data

(63) Continuation of application No. 13/180,137, filed on Jul. 11, 2011, now abandoned, and a continuation-in-part of application No. 13/040,878, filed on Mar. 4, 2011, now Pat. No. 8,287,292, which is a continuation-in-part of application No. 11/917,258, filed as application No. PCT/US2006/022952 on Jun. 13, 2006, now abandoned.

(60) Provisional application No. 61/362,802, filed on Jul. 9, 2010, provisional application No. 60/690,009, filed on Jun. 13, 2005.

(51) Int. Cl.
H01R 13/73 (2006.01)

(52) U.S. Cl.
USPC .......................................... 439/574

(58) Field of Classification Search
USPC ............. 439/574, 527, 534, 575, 542, 216
See application file for complete search history.

(56) References Cited

U.S. PATENT DOCUMENTS

| | | |
|---|---|---|
| 1,085,631 A | 2/1914 | Reed |
| 3,049,688 A | 8/1962 | Sinopoli |
| 3,433,886 A | 3/1969 | Myers |
| 4,372,629 A | 2/1983 | Propst et al. |
| 4,551,577 A | 11/1985 | Byrne |
| 4,712,232 A | 12/1987 | Rodgers |
| 4,747,788 A | 5/1988 | Byrne |
| 4,773,867 A | 9/1988 | Keller et al. |
| 4,984,982 A | 1/1991 | Brownlie et al. |
| 5,087,207 A | 2/1992 | Byrne |
| 5,092,786 A | 3/1992 | Juhlin et al. |
| 5,092,787 A | 3/1992 | Wise et al. |
| 5,096,431 A | 3/1992 | Byrne |
| 5,122,069 A | 6/1992 | Brownlie et al. |
| 5,125,852 A | 6/1992 | Archer |
| 5,129,842 A | 7/1992 | Morgan et al. |
| 5,161,997 A | 11/1992 | Defibaugh et al. |
| 5,195,288 A | 3/1993 | Penczak |

(Continued)

FOREIGN PATENT DOCUMENTS
WO 2006/138285 A3 6/2006

OTHER PUBLICATIONS
Office Action dated Feb. 25, 2011 in connection with commonly-owned U.S. Appl. No. 12/816,051.

(Continued)

Primary Examiner — Tulsidas C Patel
Assistant Examiner — Phuongchi T Nguyen
(74) Attorney, Agent, or Firm — Gardner, Linn, Burkhart & Flory, LLP

(57) ABSTRACT

A power data housing includes a channel which receives electrical receptacle housings. The housings have side latch tabs which releasably lock receptacles to the receptacle housings. The receptacle housings are received within a continuum of the channel.

22 Claims, 29 Drawing Sheets

U.S. PATENT DOCUMENTS

| | | | |
|---|---|---|---|
| 5,230,552 | A | 7/1993 | Schipper et al. |
| 5,259,787 | A | 11/1993 | Byrne |
| 5,351,173 | A | 9/1994 | Byrne |
| 5,366,388 | A | 11/1994 | Freeman et al. |
| 5,575,668 | A | 11/1996 | Timmerman |
| 5,647,763 | A | 7/1997 | Arnold et al. |
| 5,651,696 | A | 7/1997 | Jennison |
| 5,709,156 | A | 1/1998 | Gevaert |
| D407,373 | S | 3/1999 | Byrne |
| 5,921,795 | A | 7/1999 | Weener et al. |
| 6,004,157 | A | 12/1999 | Glass |
| 6,015,305 | A | 1/2000 | McHugh et al. |
| 6,024,599 | A | 2/2000 | Stathis et al. |
| 6,028,267 | A | 2/2000 | Byrne |
| 6,042,426 | A | 3/2000 | Byrne |
| 6,085,667 | A | 7/2000 | Gevaert et al. |
| 6,234,812 | B1 | 5/2001 | Ivers et al. |
| 6,254,427 | B1 | 7/2001 | Stathis |
| 6,290,518 | B1 | 9/2001 | Byrne |
| 6,379,182 | B1 | 4/2002 | Byrne |
| 6,384,336 | B1 | 5/2002 | VanderVelde et al. |
| 6,420,964 | B1 | 7/2002 | Nishikawa et al. |
| 6,435,461 | B1 | 8/2002 | Saylor et al. |
| 6,497,586 | B1 | 12/2002 | Wilson |
| 6,540,554 | B2 | 4/2003 | McCarthy |
| 6,616,005 | B1 | 9/2003 | Pereira et al. |
| 6,638,108 | B2 | 10/2003 | Tachi |
| 6,793,524 | B2 | 9/2004 | Clark et al. |
| 6,971,911 | B2 | 12/2005 | Ramsey et al. |
| 6,974,911 | B2 | 12/2005 | Hyde |
| 6,979,209 | B2 | 12/2005 | Griepentrog |
| 7,087,840 | B2 | 8/2006 | Herring et al. |
| D535,257 | S | 1/2007 | Byrne |
| 7,182,633 | B2 | 2/2007 | Byrne |
| 7,244,128 | B2 | 7/2007 | Byrne |
| 7,367,832 | B2 | 5/2008 | Muhs et al. |
| 7,407,392 | B2 | 8/2008 | Cooke et al. |
| 7,410,379 | B1 | 8/2008 | Byrne |
| 7,448,875 | B2 | 11/2008 | Timmins et al. |
| 7,481,680 | B2 | 1/2009 | Caveney et al. |
| 7,488,202 | B2 | 2/2009 | Spitaels et al. |
| 7,500,790 | B2 | 3/2009 | Erdman et al. |
| 7,559,795 | B2 | 7/2009 | Byrne |
| 7,682,187 | B2 | 3/2010 | Spitaels et al. |
| 7,690,921 | B2 | 4/2010 | Timmins et al. |
| 7,690,941 | B2 | 4/2010 | Caveney et al. |
| 7,736,178 | B2 | 6/2010 | Byrne |
| 7,811,093 | B2 | 10/2010 | Timmins et al. |
| 7,819,676 | B1 | 10/2010 | Cardoso et al. |
| 7,878,845 | B2 | 2/2011 | Byrne |
| 7,881,462 | B2 | 2/2011 | Hazani et al. |
| 7,989,738 | B2 | 8/2011 | Byrne |
| 2002/0142650 | A1 | 10/2002 | Clark et al. |
| 2002/0187682 | A1 | 12/2002 | Lincoln et al. |
| 2003/0091295 | A1 | 5/2003 | Cheng |
| 2005/0159036 | A1 | 7/2005 | Caveney et al. |
| 2006/0159399 | A1 | 7/2006 | Erdman et al. |
| 2007/0004274 | A1 | 1/2007 | Tabata et al. |
| 2007/0105432 | A1 | 5/2007 | Muhs et al. |
| 2008/0200050 | A1 | 8/2008 | Byrne |
| 2009/0004913 | A1 | 1/2009 | Caveney et al. |
| 2009/0137159 | A1 | 5/2009 | Caveney et al. |
| 2009/0163043 | A1 | 6/2009 | Demers et al. |
| 2010/0317223 | A1* | 12/2010 | Byrne .................. 439/540.1 |
| 2010/0322576 | A1 | 12/2010 | Rhoney et al. |
| 2011/0021050 | A1* | 1/2011 | Byrne .................. 439/215 |
| 2011/0088942 | A1* | 4/2011 | Byrne .................. 174/505 |
| 2012/0009820 | A1* | 1/2012 | Byrne .................. 439/625 |
| 2012/0015534 | A1* | 1/2012 | Wavra et al. .................. 439/131 |
| 2012/0083146 | A1* | 4/2012 | Byrne .................. 439/214 |
| 2012/0083171 | A1* | 4/2012 | Byrne .................. 439/888 |
| 2012/0200989 | A1* | 8/2012 | Byrne et al. .................. 361/641 |
| 2012/0231645 | A1* | 9/2012 | Byrne .................. 439/215 |
| 2012/0231658 | A1* | 9/2012 | Byrne .................. 439/540.1 |
| 2012/0231668 | A1* | 9/2012 | Byrne .................. 439/628 |
| 2012/0261988 | A1* | 10/2012 | Byrne et al. .................. 307/35 |
| 2013/0037298 | A1* | 2/2013 | Byrne .................. 174/68.3 |

OTHER PUBLICATIONS

Office Action dated Sep. 27, 2011 in connection with commonly-owned U.S. Appl. No. 12/816,051.

Office Action dated Jul. 10, 2012 connection with commonly-owned U.S. Appl. No. 13/480,539.

International Search Report and Written Opinion of the International Search Authority in International Application No. PCT/US2006/022952 (WO2006/138285), mailed Jan. 11, 2007.

* cited by examiner

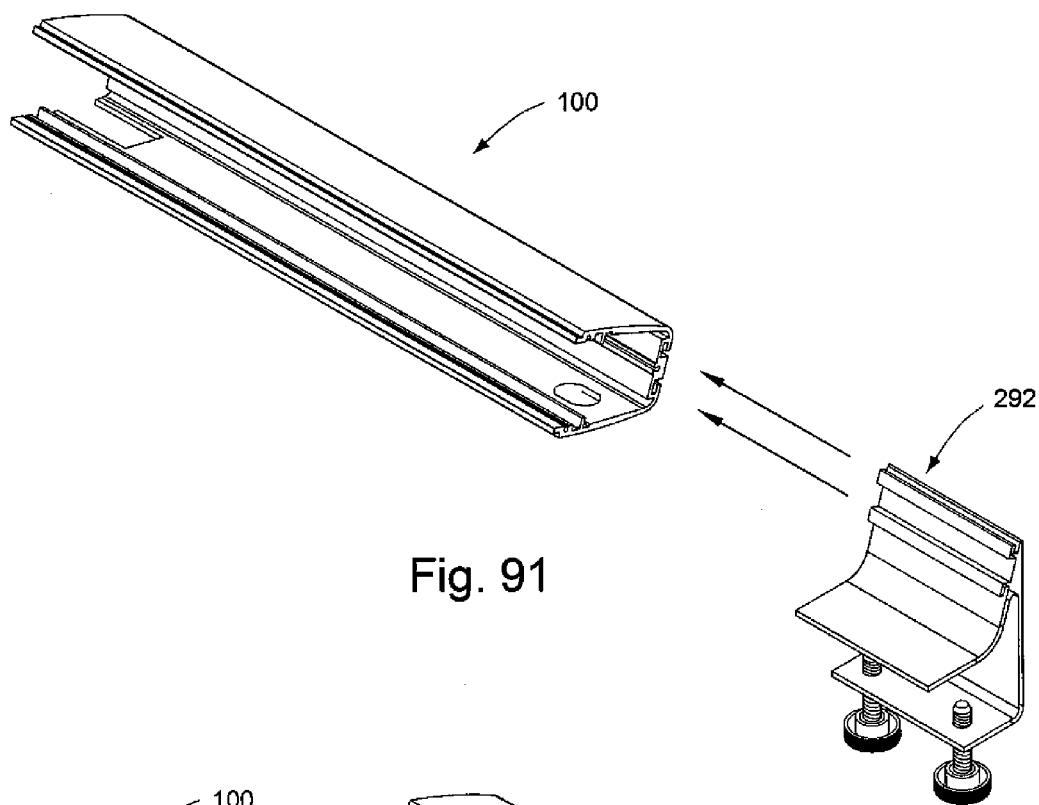
Fig. 91
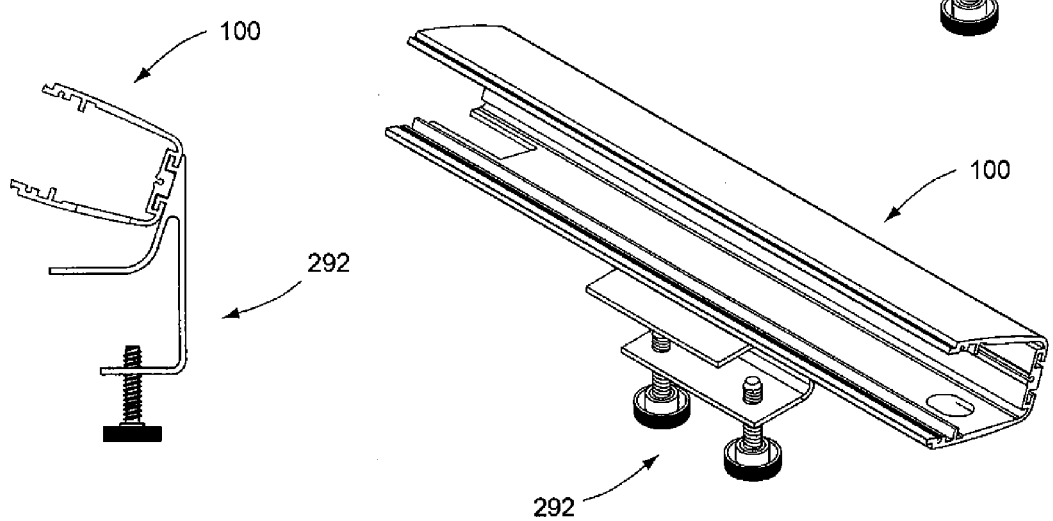
Fig. 92
Fig. 93

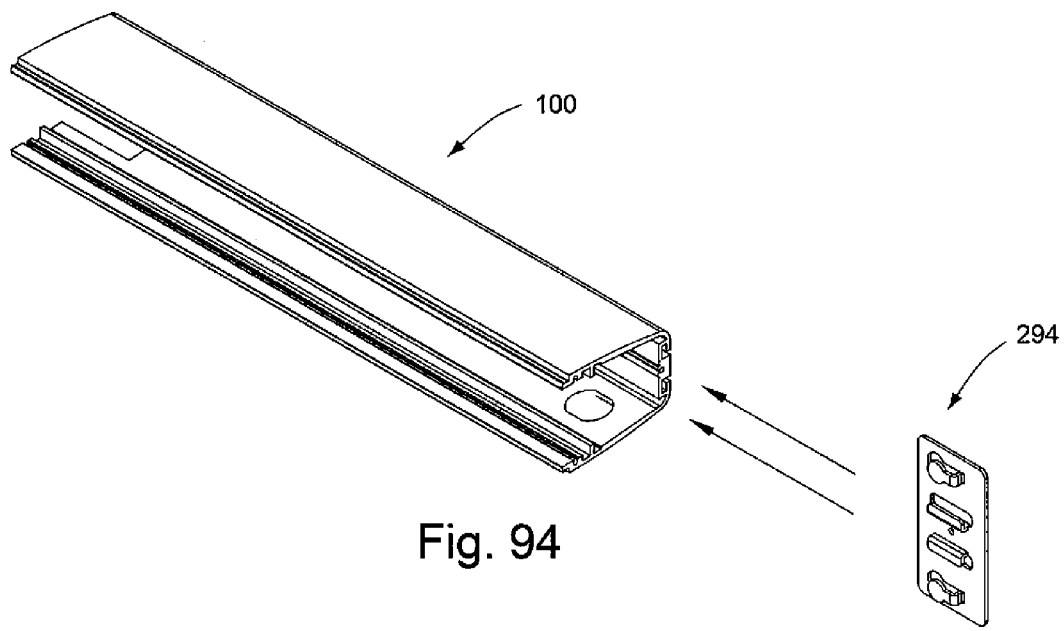
Fig. 94
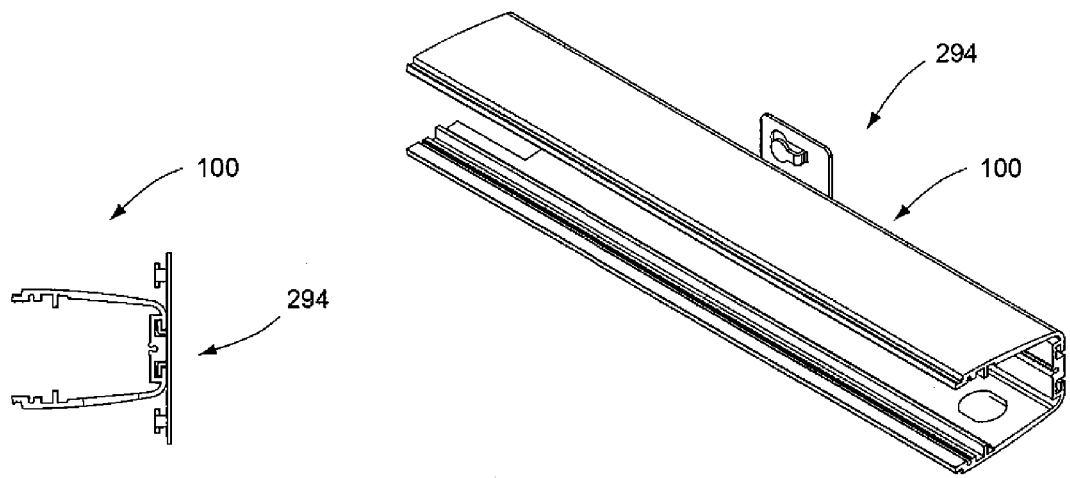
Fig. 95
Fig. 96

POWER DATA HOUSING

CROSS REFERENCE TO RELATED APPLICATIONS

The present application is a continuation of U.S. patent application Ser. No. 13/180,137, filed Jul. 11, 2011, which claims the priority benefit of U.S. provisional application Ser. No. 61/362,802, filed Jul. 9, 2010. The present application is also a continuation-in-part of U.S. patent application Ser. No. 13/040,878, filed Mar. 4, 2011, which is a continuation-in-part of U.S. patent application Ser. No. 11/917,258, filed Dec. 12, 2007, which is a §371 national stage of international application Ser. No. PCT/US2006/022952, filed Jun. 13, 2006, which claims the priority benefit of U.S. provisional application Ser. No. 60/690,009, filed Jun. 13, 2005.

FIELD OF THE INVENTION

The present invention relates to power and data elements for use in power distribution systems.

BACKGROUND OF THE INVENTION

With various types of power distribution assemblies, various numbers of electrical receptacles, data ports, communication ports, and other electronic elements may be utilized. It would be advantageous if there was commonality among the various types of electrical elements which may be utilized within a power distribution assembly. Further, it would be advantageous if these electrical elements could be readily reassembled in terms of configurations, and also utilize a means for receiving and supporting the electrical elements.

SUMMARY OF THE INVENTION

The present invention provides a channel or housing element for purposes of receiving and supporting various ones of outlet receptacle housings, data port housings, communication port housings, electrical receptacle assemblies, and the like. Each of the assemblies comprises a receptacle housing and a receptacle. The power data housing comprises an elongated channel formed with a pair of opposing sides having inner side surfaces. A pair of longitudinally extending ribs are formed on corresponding ones of the inner side surfaces. The ribs face each other and partially extend into a spatial area of the channel. A pair of opposing upper and lower channels are provided, with the channels formed on the inner side surfaces and face each other. Opposing upper and lower channels are adapted to slidably receive structures of the receptacle assemblies, so that the assemblies can be positioned at any of a number of locations along a continuum of the channel.

The receptacle assemblies are structured and the upper and lower channels are sized and configured so that the receptacle assemblies can be positionally aligned with the channel in spatial orientations which are 90 degrees apart from each other.

In accordance with other aspects of the invention, at least one of the opposing sides comprises a cord hole for receiving cords and cables. Each of the opposing sides is integral with or otherwise connected together with a floor section. A further configuration of the power data housing comprises a second elongated channel having a back-to-back configuration with the elongated channel. A floor section forms a common wall between the elongated channel and the second elongated channel. Each of the opposing sides can also be curvilinear in structure.

At least one of the receptacle housings can be coupled to an electrical outlet receptacle, and slidably received within the elongated channel. The receptacle housing can be released from the coupling to the electrical receptacle, and includes means for being coupled to data ports and other communications receptacles. At least one of the receptacles can comprise a Type B receptacle. The receptacles can include electrical outlets, data ports, high definition multi-media interface receptacles, video receptacles and a docking station. A face plate configuration can be coupled to the channel through a coupling between tabs of the channel which are captured within slots formed on the face plate configuration.

The power data housing can be coupled to a support bracket, with the support bracket having supports for components associated with an external portion of a floor section connecting between opposing sides. The power data housing can also be coupled to a hanging bracket for hanging the housing on a vertical surface, with the bracket being slidably received on an outside of a floor section which couples together the opposing sides.

These and other objects, advantages, purposes and features of the present invention will become apparent upon review of the following specification in conjunction with the drawings.

BRIEF DESCRIPTION OF THE DRAWINGS

FIG. 91 illustrates the use of the power data housing channel shown in FIG. 1, with a support bracket, with FIG. 91 showing the housing channel and support bracket in an exploded configuration as the bracket is to be slidably received by the housing channel;

FIG. 92 is a right-side end view showing the slidable assembly of the housing channel and support bracket of FIG. 91;

FIG. 93 is a perspective view similar to FIG. 91, but showing the housing channel and support bracket in a fully assembled state;

FIG. 94 is a perspective and exploded view of the power data housing channel shown in FIG. 1, and further showing the housing channel with a hanging bracket which may be slidably received by the housing channel;

FIG. 95 is a right-side end view showing the hanger bracket as slidably coupled to the housing channel;

FIG. 96 is a perspective view similar to FIG. 94, but showing the housing channel and the hanger bracket in a fully assembled state;

DESCRIPTION OF THE PREFERRED EMBODIMENTS

Figure 1:
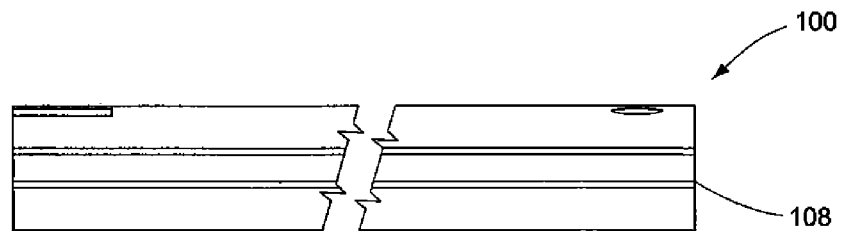
FIG. 1 is a rear, elevation view of a power data housing in accordance with the invention.
Figure 2:
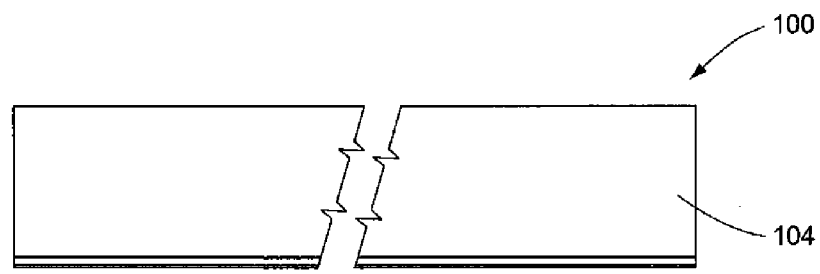
FIG. 2 is a plan view of the housing shown in FIG. 1.
Figures 3, 4, 5:
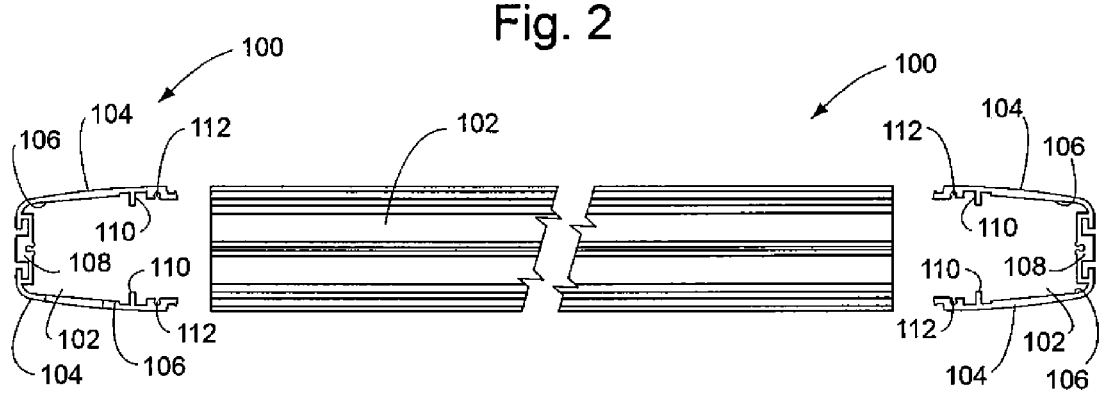
FIG. 3 is a left-side end view of the housing shown in FIG. 1.
FIG. 4 is a front, elevation view of the housing shown in FIG. 1.
FIG. 5 is a right-side end view of the housing shown in FIG. 1.
Figure 6:
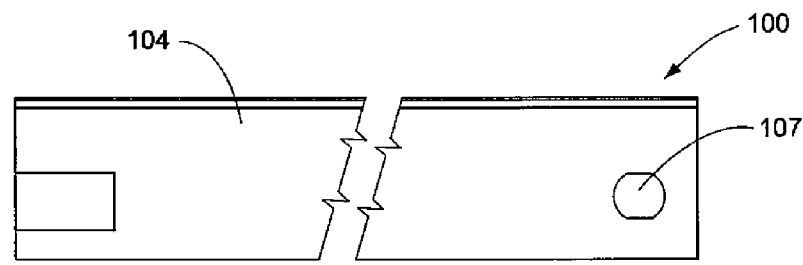
FIG. 6 is an underside view of the housing shown in FIG. 1.
Figure 101:
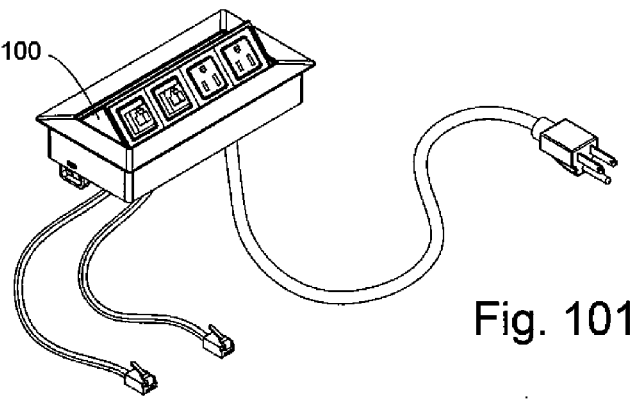
FIG. 101 is a perspective view of the power data housing channel shown in FIG. 1, similar to FIG. 99, but showing the housing channel being used within a power distribution box somewhat smaller than the box of FIG. 99, but incorporating a pair of data port assemblies and a pair of simplex receptacle assemblies.

The principles of the invention are disclosed, by way of example, in a power data housing 100 as described in subsequent paragraphs herein and illustrated in FIGS. 1-101. The power data housing 100 is adapted to receive and support various ones of receptacle housings, data port housings, communication port housings, and the like, and to support the same along a continuum of locations. Further, and according to the invention, the individual components can be assembled and located relative to each other within the power data housing 100 and in various configurations.

Figure 7:
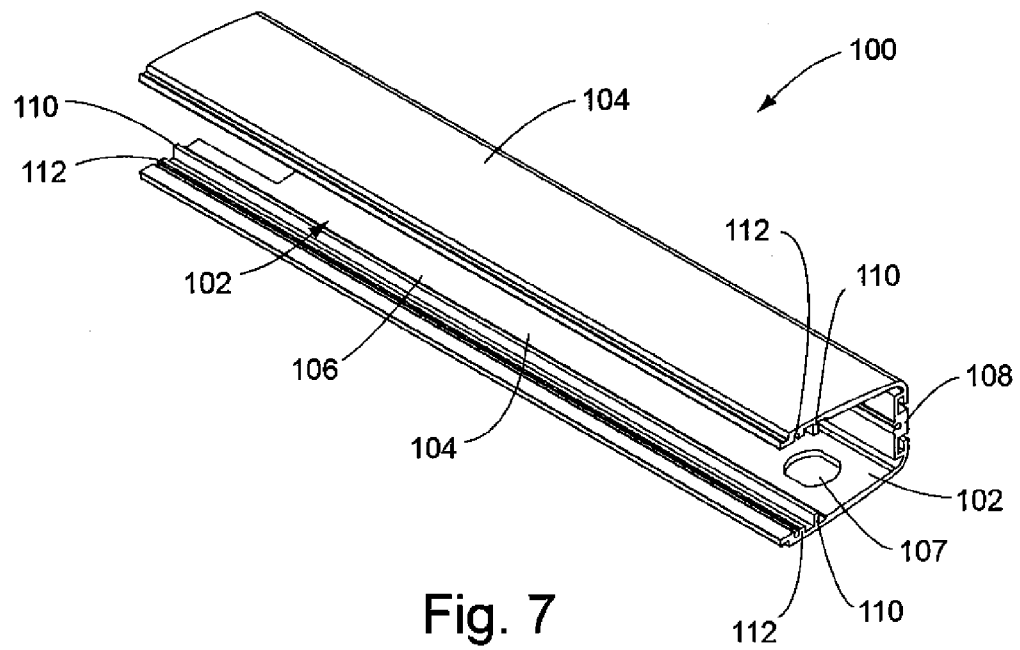
FIG. 7 is a front and right-side perspective view of the housing shown in FIG. 1.
Figure 8:
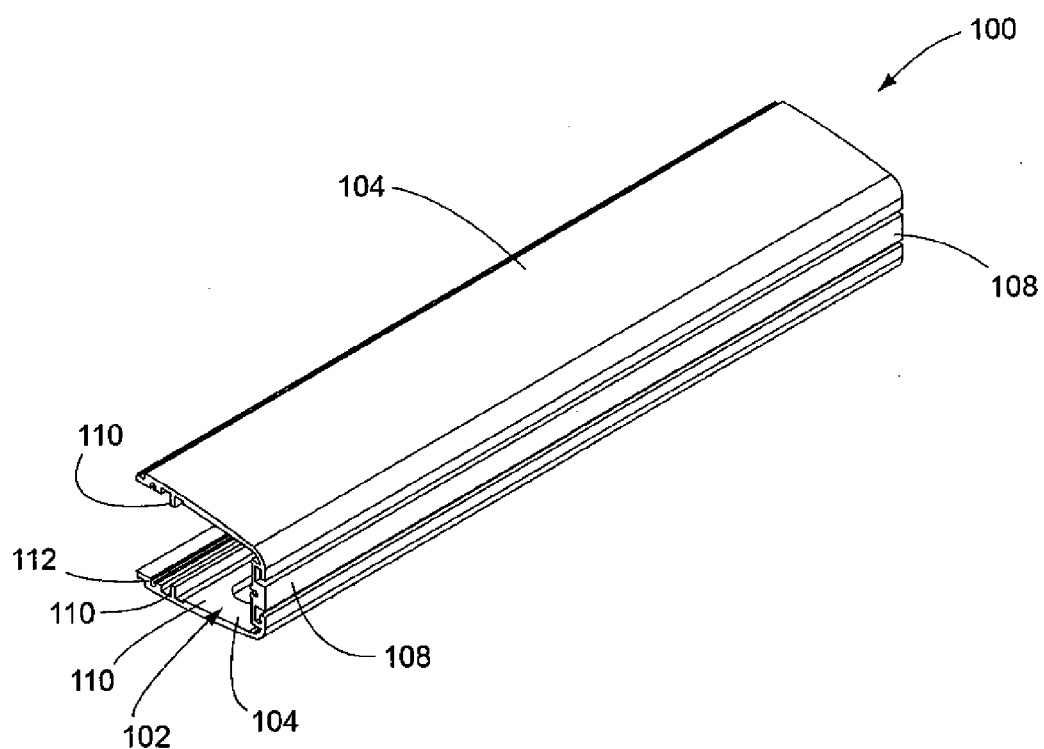
FIG. 8 is a rear, perspective view of the housing shown in FIG. 1.

Turning specifically to the drawings, FIGS. 1-6 illustrate various engineering views of the power data housing 100 in accordance with the invention. Further, FIG. 7 illustrates a front, perspective view of the power data housing 100, while FIG. 8 illustrates a rear, perspective view of the power data housing 100. The power data housing 100 includes an elongated channel 102 formed between a pair of opposing sides 104. The opposing sides 104 have inner side surfaces 106. As shown particularly in FIGS. 6 and 7, one of the opposing sides 104 includes a cord hole 107. The cord hole 107 is for purposes of being able to receive, within the inner side surfaces 106, and channel 102, electrical, data, and other types of communication cords for energizing components which are received in the channel 102.

The opposing sides 104 are integral with or otherwise connected together with a section characterized as a floor section 108. At the upper portions of each of the inner side surfaces 106 is a longitudinally extending rib 110. Positioned immediately above the ribs 110 are a set of opposing channels 112.

Figure 9:
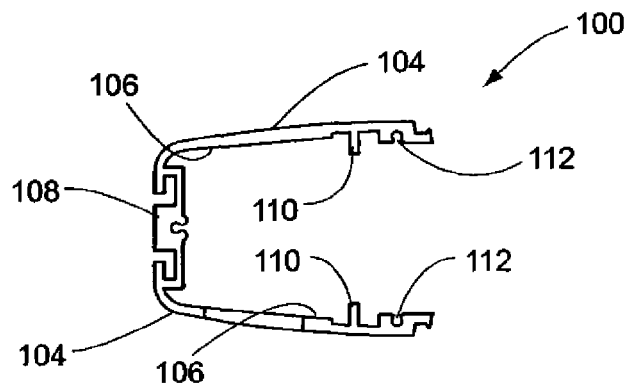
FIG. 9 is a left-side end view of the housing shown in FIG. 1, substantially identical to the view of FIG. 3.
Figure 10:
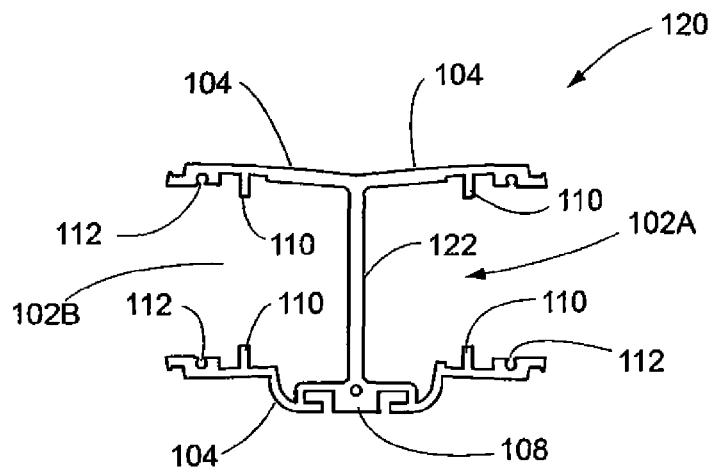
FIG. 10 is an end view of a further embodiment of a power data housing in accordance with the invention.

As will be described in subsequent paragraphs herein, the power data housing 100 and other power data housings according to the invention provide for what can be characterized as receptacle or other electrical component housings. Still further, other configurations of power data housings in accordance with the invention can be provided. For example, FIG. 9 is a left-side end view of the power data housing 100, with the view being an enlarged view of the housing 100 shown in FIG. 3. A different configuration of a power data housing and according to the invention and in accordance with the second embodiment, is the power data housing 120 illustrated in FIG. 10. The power data housing 120 essentially consists of a pair of "back-to-back" housing channels. More specifically, and using numerical references which correspond to common elements associated with the power data housing 100, FIG. 10 illustrates the power data housing 100 as having a pair of opposing channels 102A and 102B. The channels oppose each other and are separated by a common section which can be characterized as a center section 122. As with the power data housing 100, the power data housing 120 includes, for each of the channels 102A and 102B, a set of opposing sides 104 having inner side surfaces 106. Longitudinally extending ribs 110 extend inwardly toward the channels 102A and 102B from the inner side surfaces 106. Positioned adjacent the longitudinally extending ribs 110 are opposing channels 112.

Figure 11:
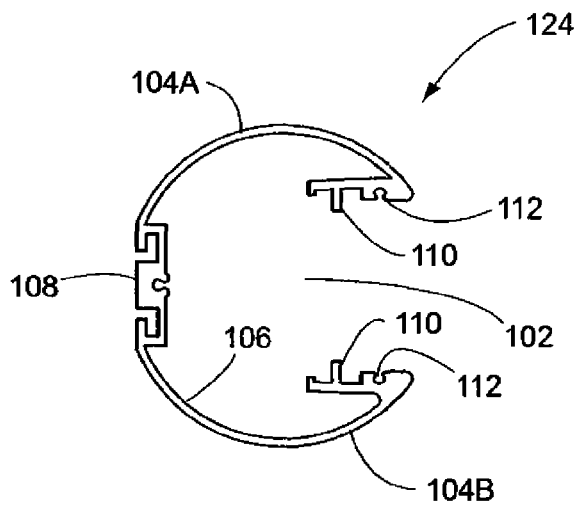
FIG. 11 is an end view of a third embodiment of a power data housing in accordance with the invention.
Figure 12:
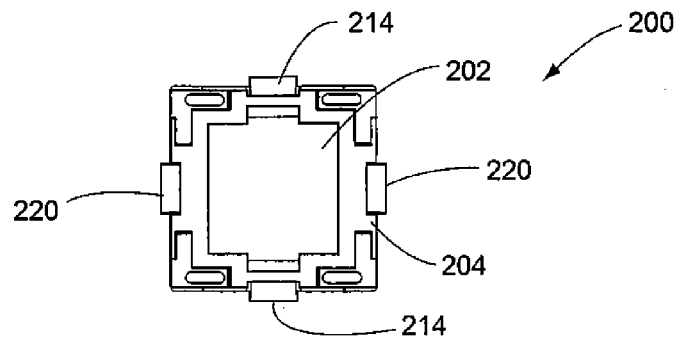
FIG. 12 is a rear view of a receptacle housing in accordance with the invention.
Figure 13:
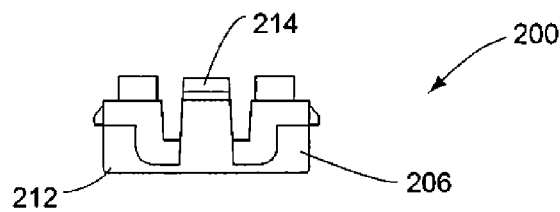
FIG. 13 is a plan view of the receptacle housing shown in FIG. 12.
Figure 14:
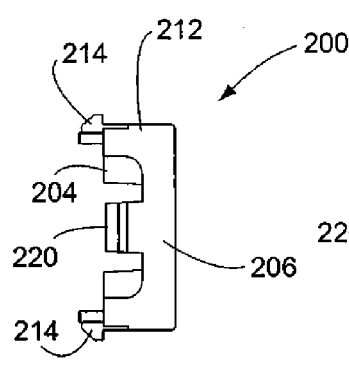
FIG. 14 is a left-side end view of the receptacle housing shown in FIG. 12.
Figure 15:
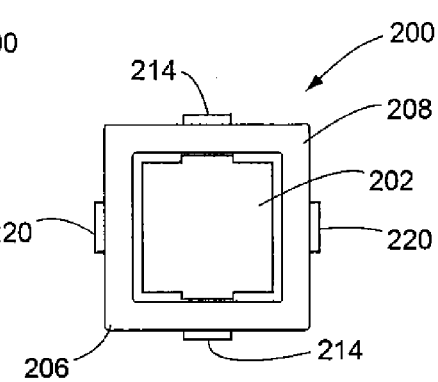
FIG. 15 is a front, elevation view of the receptacle housing shown in FIG. 12.
Figure 16:
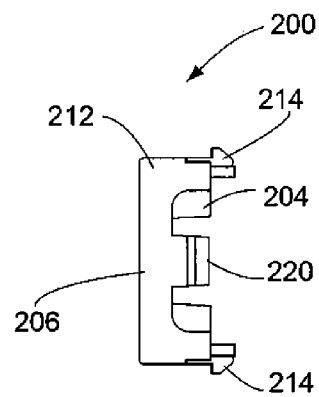
FIG. 16 is a right-side end view of the receptacle housing shown in FIG. 12.
Figure 17:
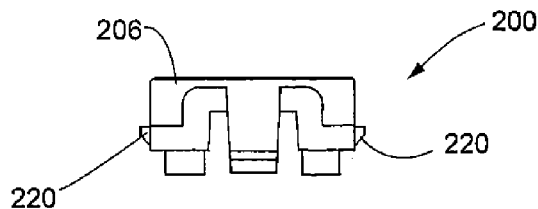
FIG. 17 is an underside view of the receptacle housing shown in FIG. 12.
Figure 18:
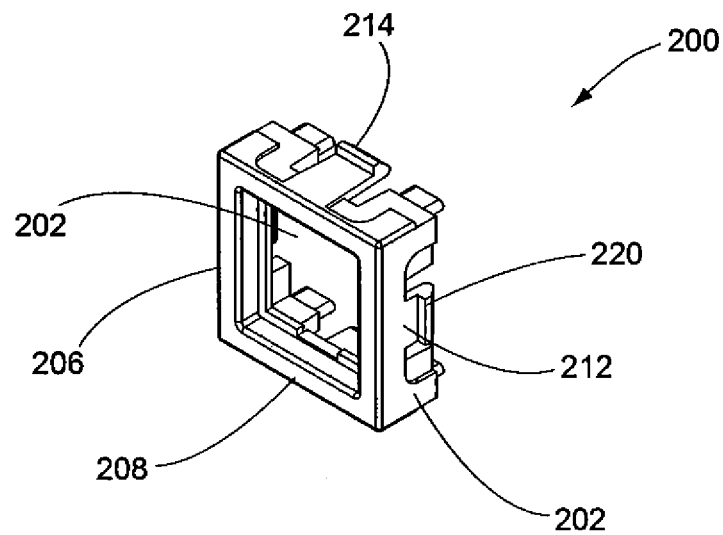
FIG. 18 is a front, perspective view of the receptacle housing shown in FIG. 12.
Figure 19:
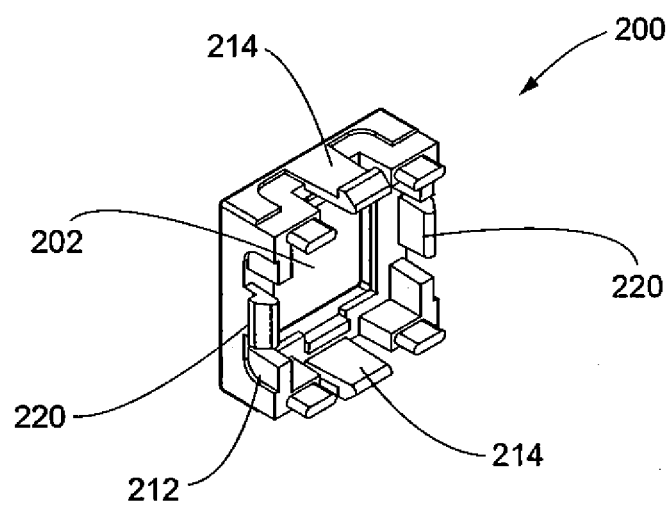
FIG. 19 is a rear, perspective view of the receptacle housing shown in FIG. 12.

A still further embodiment of a power data housing in accordance with the invention is shown as power data housing 124 in FIG. 11. In power data housing 124, instead of having linear opposing sides 104, the opposing sides are shown as opposing sides 104A and 104B. The sides 104A and 104B are curvilinear in structure. As with the power data housing 100, the power data housing 124 has what can be characterized as inner side surfaces 106. A floor section 108 is located on one side and couples the opposing sides 104A and 104B together. A pair of longitudinally extending ribs 110 extend inwardly toward the channel 102, and a pair of opposing channels 112 face each other adjacent the ribs 110.

As earlier stated, the power data housing 100 in accordance with the invention (and other power data housings in accordance with the invention as described herein) are capable of receiving various types of electrical components. One such type of electrical component is what can be characterized as a receptacle housing. Such a receptacle housing is illustrated as receptacle housing 200 as shown in the engineering views of FIGS. 12-17 and the perspective views of FIGS. 18 and 19. As shown in FIGS. 12-19, the receptacle housing 200 includes an opening 202 which is adapted to receive an outlet receptacle or other similar type of electrical, data or communications component. The housing 200 also includes a main body 204, having a front cover 206. The front cover 206 includes a face 208. The cover 206 also includes a set of sides 212. A pair of latch tabs 214 are positioned at upper and lower sides of the front cover 206. Side latch tabs 220 are positioned on opposing sides of the front cover 206.

Figure 20:
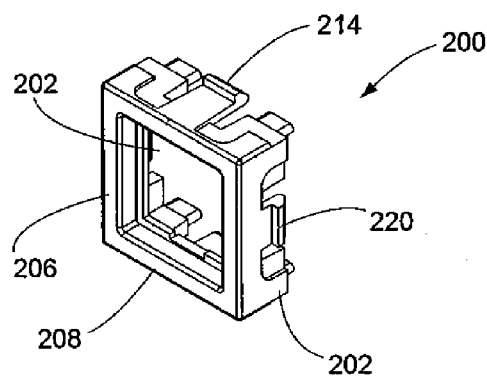
FIG. 20 is a front, perspective view of the receptacle housing shown in FIG. 12.
Figure 21:
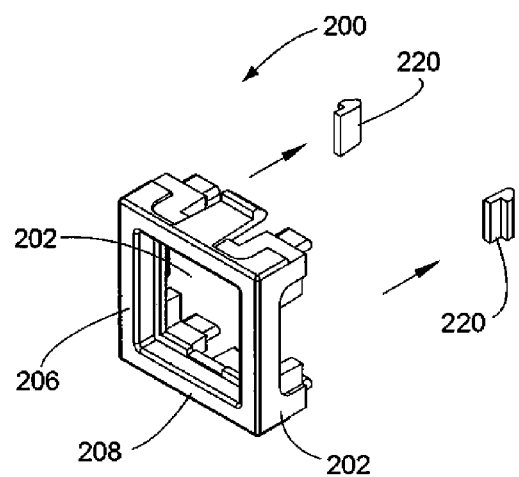
FIG. 21 is a perspective and partially exploded view of the receptacle housing shown in FIG. 12, and showing the relative positioning of the removable side latch tabs.
Figures 22, 23:
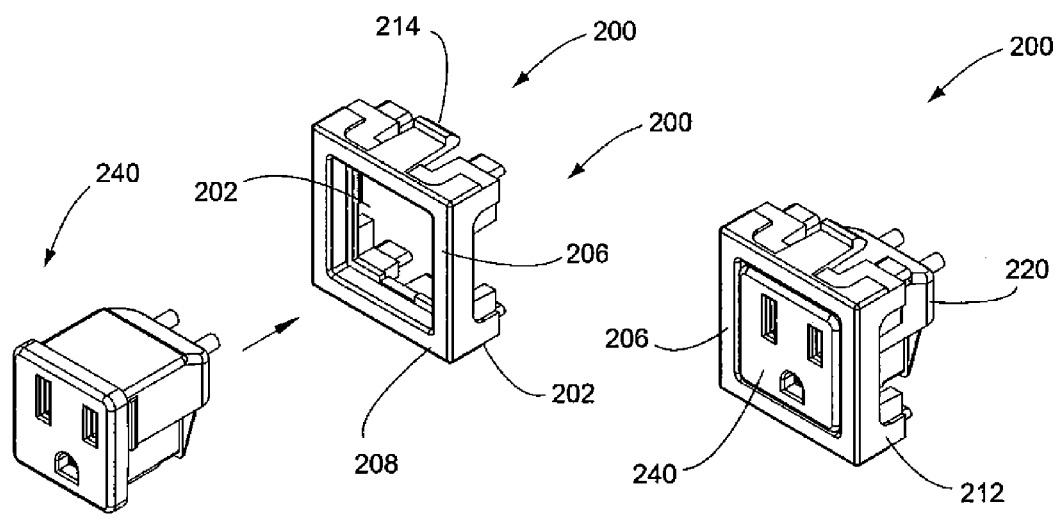
FIG. 22 is an exploded view of the receptacle housing shown in FIG. 12, and showing the main body of the receptacle housing consisting of the housing shell and a simplex receptacle, thereby forming a simplex receptacle assembly.
FIG. 23 is a perspective view of the simplex receptacle assembly shown in FIG. 22, but shown in a fully assembled state.

FIGS. 20-23 illustrate the use of the receptacle housing 200 with a receptacle assembly characterized as a simplex electrical receptacle assembly 240. FIG. 23 shows a fully assembled simplex receptacle assembly. FIG. 20 shows the receptacle housing 200 previously described herein, and FIG. 21 shows the housing 200 with removable tabs 220. FIG. 22 illustrates an exploded view showing the receptacle housing 200, with a simplex receptacle 240 positioned so as to be received within the opening 202. In this particular instance, an insert may not be required, since the opening 202 can be originally sized so as to receive the receptacle 240.

Figure 24:
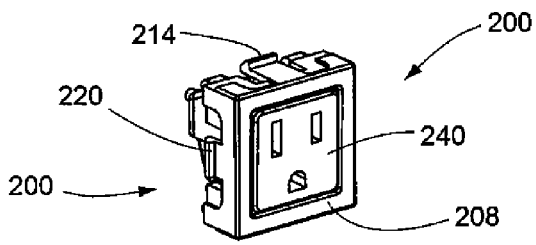
FIG. 24 is a left, front perspective view of the simplex receptacle assembly shown in FIG. 23.
Figure 25:
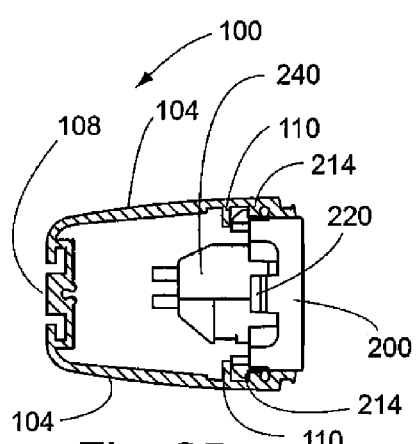
FIG. 25 is a left-side end view of the power data housing channel shown in FIG. 1, with the simplex receptacle assembly of FIG. 24 as slidably inserted into the housing channel.
Figure 26:
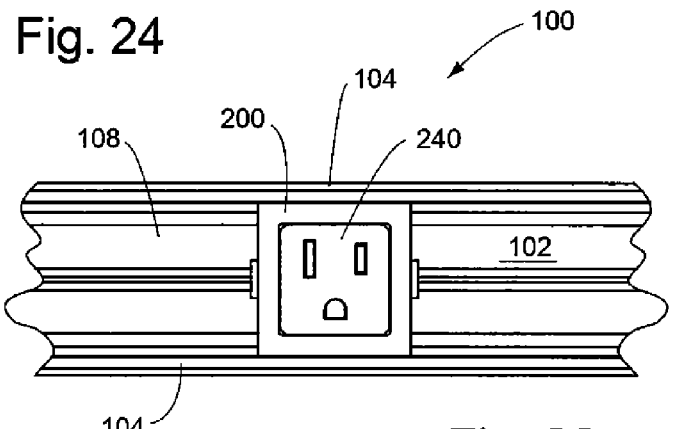
FIG. 26 is a front, perspective view of the simplex receptacle assembly and housing channel as shown in FIG. 25.

FIGS. 24, 25, and 26 illustrate how the simplex receptacle assembly 240 and the receptacle housing 200 are mounted within the channel 102 of the power data housing 100. Specifically, with reference primarily to FIG. 25, the receptacle assembly 240 is shown as appropriately coupled to the receptacle housing 200. The receptacle housing 200 can then be "slid" into the channel 102 through either end of the power data housing 100. When the receptacle housing 200 is slid into the channel 102, the upper and lower latch tabs 214 of the receptacle housing 200 are received within the opposing upper and lower channels 112 positioned within the inner side surfaces 106 of the housing 100. With this positioning, the rear portions of the receptacle housing 200 abut the longitudinally extending ribs 110, also formed as part of the inner side surfaces 106. With this positioning, the receptacle housing 200 and the simplex receptacle assembly 240 can be positioned anywhere along a continuum of the power data housing 100 within the channel 102.

FIGS. 24-26 illustrate the use of the power data housing 100 and channel 102 with a particular simplex receptacle 240. The power data housing 100 and channel 102 in accordance with the invention can also be utilized with various other types of electrical, data and communication components. Further, it should be emphasized that the combined receptacle housing 200 and simplex receptacle assembly 240 can be rotated 90 degrees in either direction, and still be received appropriately within the channel 102 of the power data housing 100. In such a situation, the upper and lower channels 112 of the channel 102 are used to capture the side latch tabs 220 of the receptacle housing 200. Further, the receptacle housing 200 and other components subsequently described herein can be rotated 180 degrees relative to the position of the housing 200 shown at FIG. 24. Accordingly, a concept of the invention is to permit relative angular rotation of a housing which houses an electrical, communications or data component, with the rotation being allowed at 90 degrees, 180 degrees, and 270 degrees.

Figure 27:
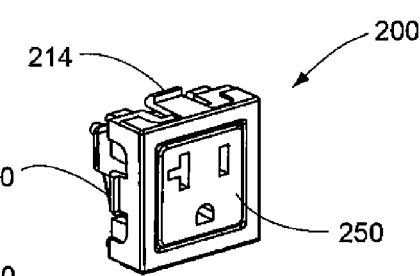
FIG. 27 is a front, perspective view of a further simplex receptacle assembly, with a simplex receptacle corresponding to a Type B receptacle.
Figure 28:
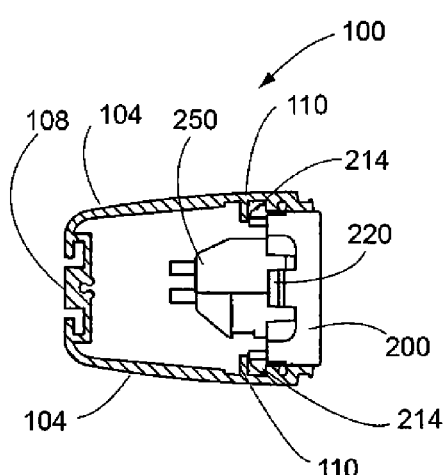
FIG. 28 is a left-side end view of the simplex receptacle assembly of FIG. 27, as slidably inserted into the housing channel of FIG. 1.
Figure 29:
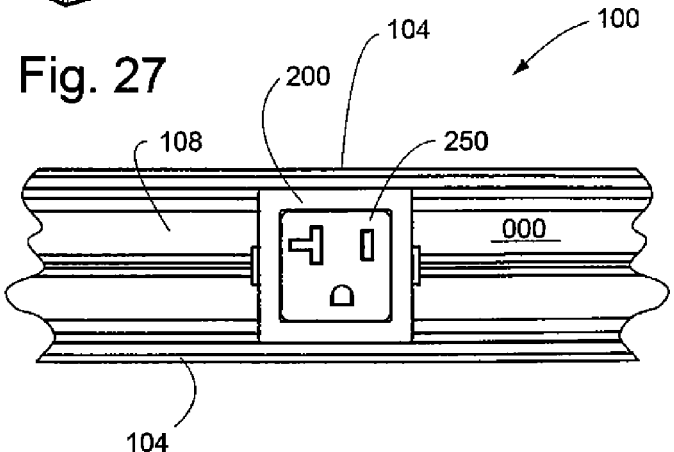
FIG. 29 is a front, elevation view of the simplex receptacle assembly of FIG. 27 as inserted into the housing channel of FIG. 1.
Figure 30:
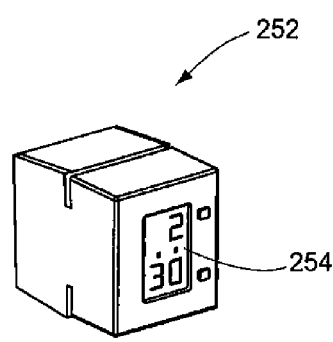
FIG. 30 is a front, perspective view of a clock assembly in accordance with the invention.
Figure 31:
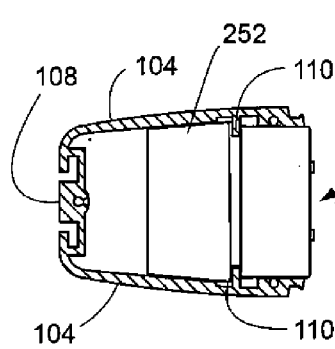
FIG. 31 is a left-side end view of the clock assembly shown in FIG. 30 as slidably assembled into the housing channel of FIG. 1.
Figure 32:
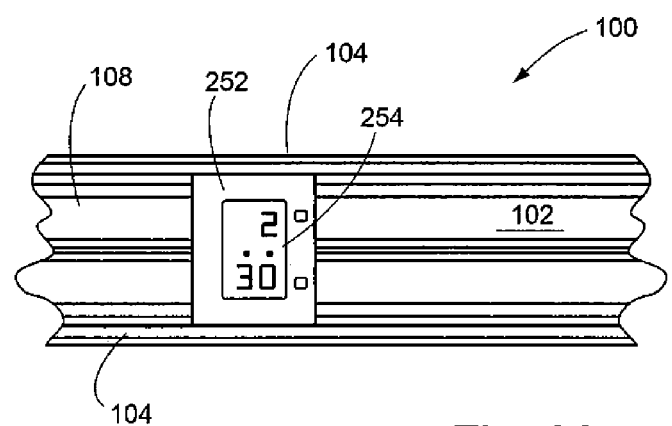
FIG. 32 is a front, elevation view of the clock assembly of FIG. 30 as inserted into the housing channel of FIG. 1.

Returning specifically to FIGS. 27-29, the receptacle housing 200 and the power data housing 100 are shown as being utilized to receive a simplex receptacle characterized as a Type B receptacle 250. Further, FIGS. 30-32 illustrate the use of the power data housing 100 and channel 102 with a clock housing 252 and clock assembly 254. For purposes of releasably securing the clock assembly 254 within the channel 102, the clock housing 252 can include appropriate components to be received within and captured by the upper and lower channels 112 of the channel 102.

Figure 33:
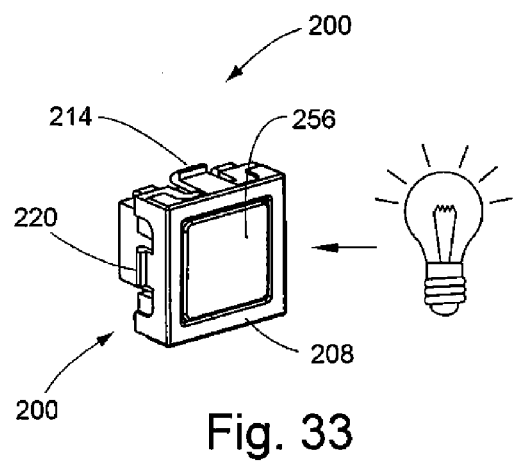
FIG. 33 is a partially diagrammatic and partially front, perspective view of a light assembly in accordance with the invention.
Figure 34:
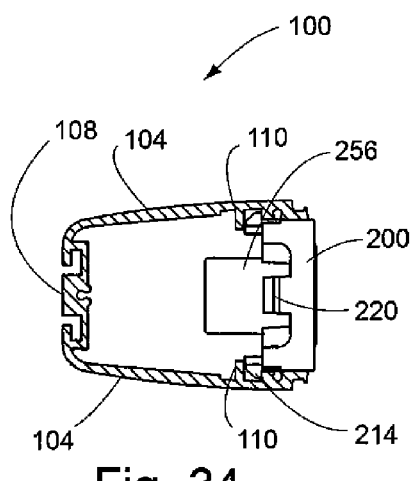
FIG. 34 is a left-side end view of the light assembly of FIG. 33 as slidably inserted into the housing channel of FIG. 1.
Figure 35:
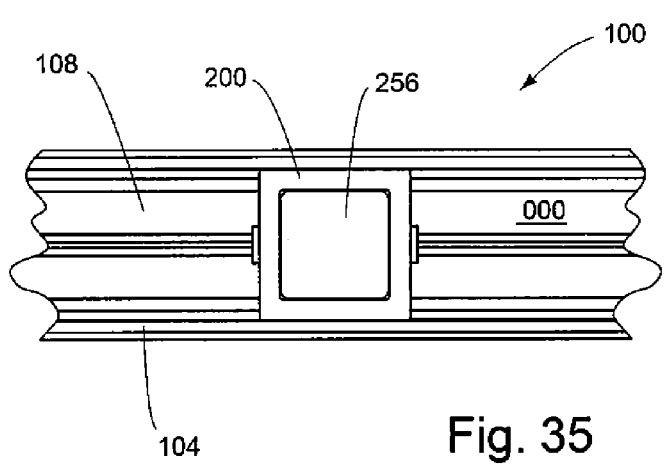
FIG. 35 is a front, elevation view of the housing channel of FIG. 1 with the light assembly of FIG. 33 inserted therein.
Figure 36:
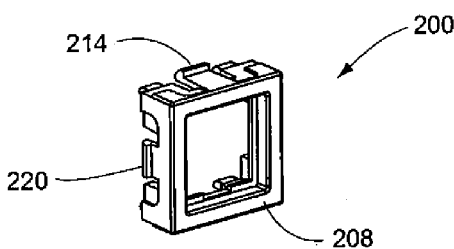
FIG. 36 is a front, perspective view of the receptacle housing shown in FIG. 12, with the view being somewhat similar to the perspective view of FIG. 18.
Figure 37:
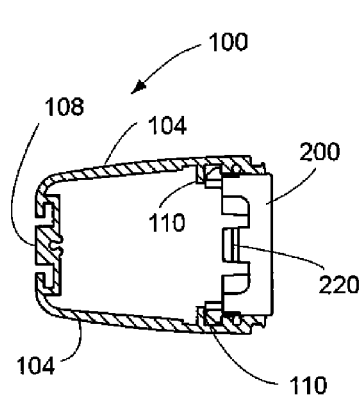
FIG. 37 is a left-side end view of the power data housing channel shown in FIG. 1, with the receptacle housing shown in FIG. 36 being slidably inserted therein.
Figure 38:
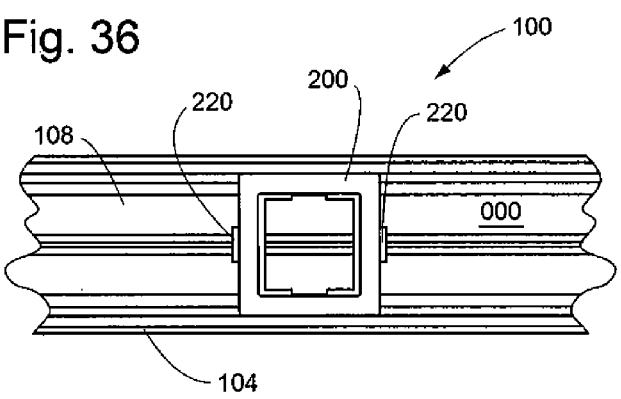
FIG. 38 is a front, elevation view of the receptacle housing and power data housing channel shown in FIG. 37.
Figure 39:
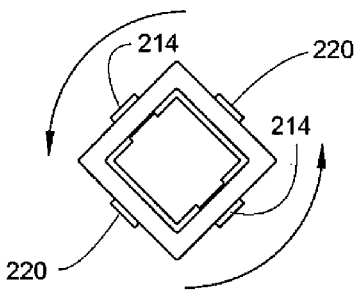
FIG. 39 is a front, elevation and partially diagrammatic view of the receptacle housing shown in FIG. 36, and illustrating how the receptacle housing can be rotated 90.degree., 180.degree. or 270.degree., relative to its position shown in FIG. 38.
Figure 40:
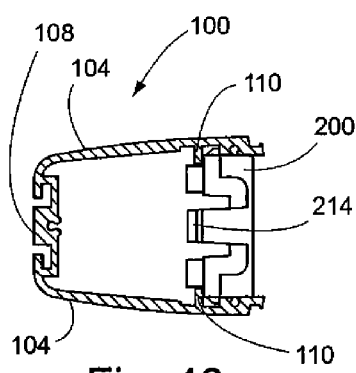
FIG. 40 is a left-side end view of the power data housing channel shown in FIG. 1, with the receptacle housing shown in FIG. 36 being slidably inserted into the power data housing channel, but with the insertion occurring at a 90.degree. angle relative to the position of the receptacle housing within the power data housing channel as shown in FIG. 38.
Figure 41:
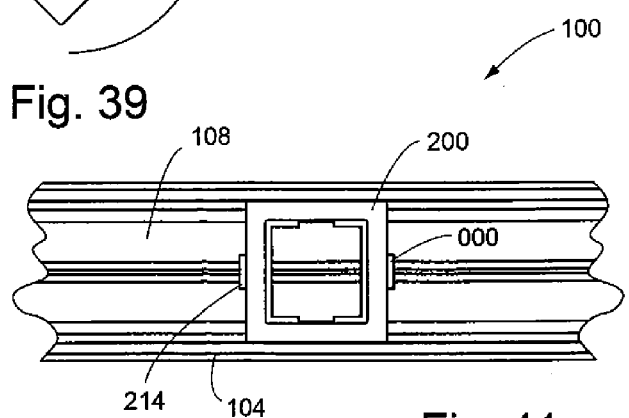
FIG. 41 is a front, elevation view of the receptacle housing and power data housing channel as shown in FIG. 40.
Figure 42:
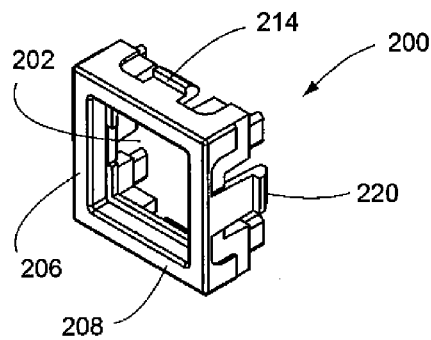
FIG. 42 is a front, perspective view of the receptacle housing shown in FIG. 12.
Figure 43:
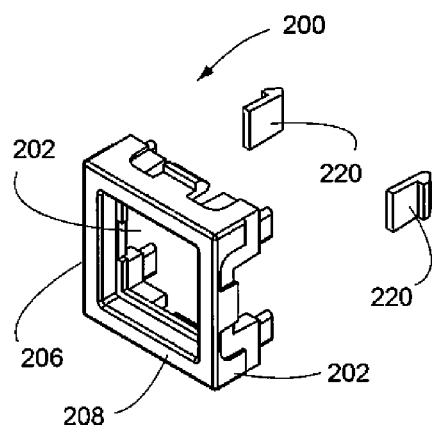
FIG. 43 is a perspective and partially exploded view of the receptacle housing shown in FIG. 12, and showing the relative positioning of the removable side latch tabs.
Figure 44:
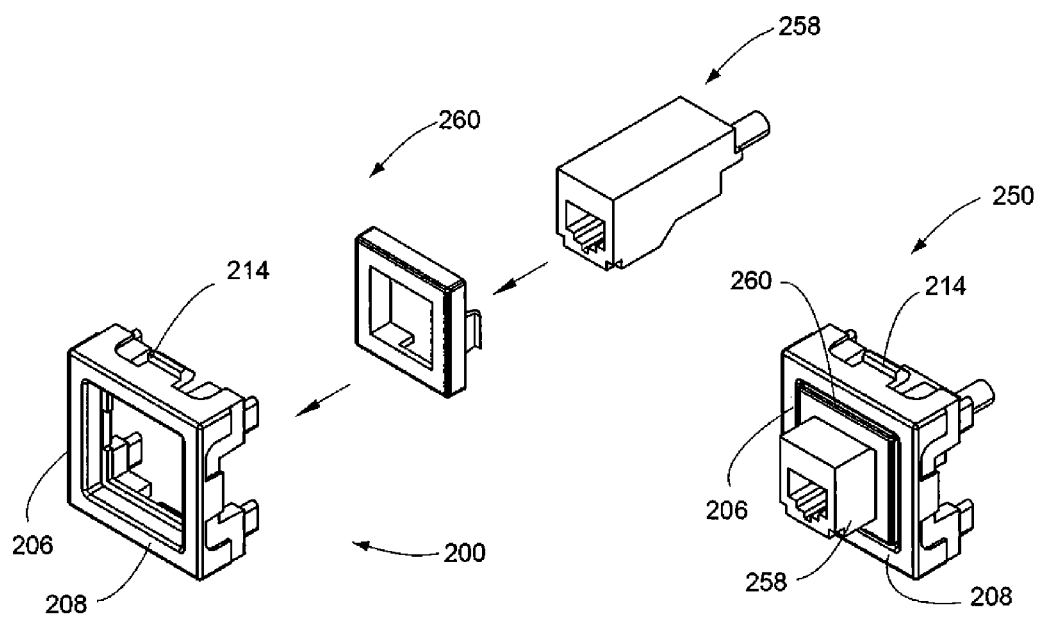
FIG. 44 is an exploded view of the receptacle housing shown in FIG. 12, and showing the main body of the receptacle housing consisting of the housing shell, a data port insert and a data port, thereby forming a data port assembly.
Figure 45:
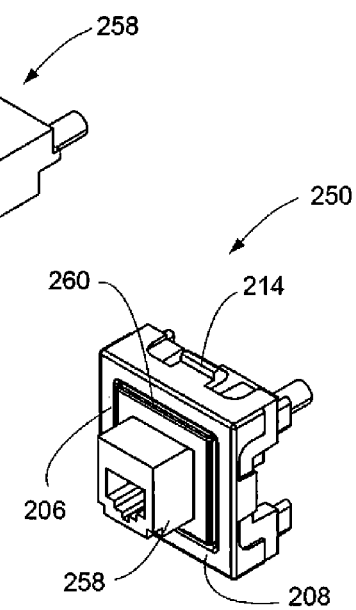
FIG. 45 is a perspective view of the data port assembly shown in FIG. 44, but showing the assembly in a fully assembled state.
Figure 46:
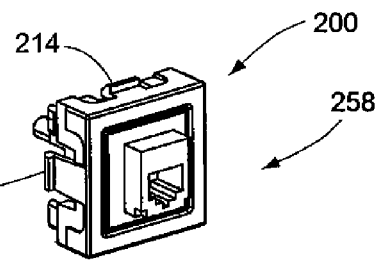
FIG. 46 is a front, perspective view of the data port assembly shown in FIG. 45, but showing the perspective view from the left side of the data port assembly.

FIGS. 33-35 illustrate the use of a light assembly 256 in combination with a receptacle housing 200 as received within the power data housing 100.

Figure 47:
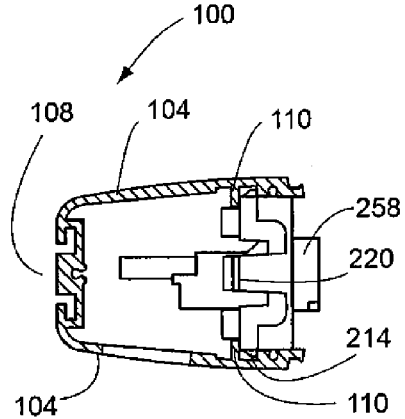
FIG. 47 is a left-side end view of the power data housing channel shown in FIG. 1, with the data port assembly of FIG. 46 as slidably inserted into the housing channel.
Figure 48:
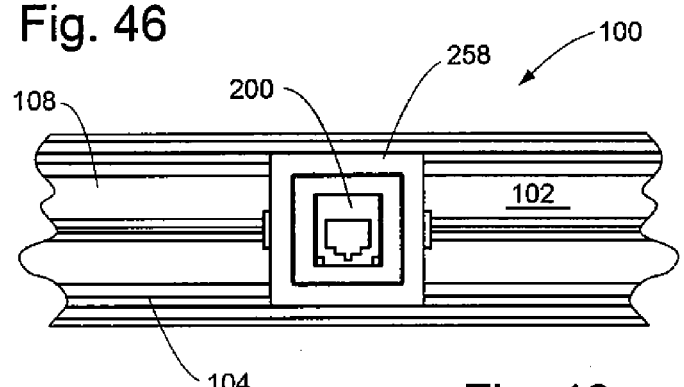
FIG. 48 is a front, elevation view of the data port assembly and housing channel as shown in FIG. 47.

FIGS. 36-41 illustrate views similar to views previously described herein, and include a receptacle housing 200 as the housing 200 may be received within the power data housing 100. The purpose of FIGS. 36-41 is to illustrate the concept that the receptacle housing 200 can be rotated 90 degrees, 180 degrees, or 270 degrees relative to an initial position, and still be received within the channel 200. As previously described, this will occur through connections of various tabs of the receptacle housing 200 with the channel 102. FIGS. 42-48 illustrate the use of the receptacle housing 100 with a data port 258 and data port insert 260. FIGS. 47 and 48 illustrate the data port 258 and data port insert 260 as received with the receptacle housing 200 within the channel 102.

Figure 49:
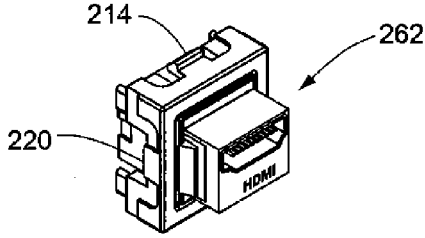
FIG. 49 is a perspective view of a first embodiment of an assembled high definition multimedia interface ("HDMI") receptacle assembly consisting of an HDMI receptacle and receptacle housing with the side tabs removed.
Figure 50:
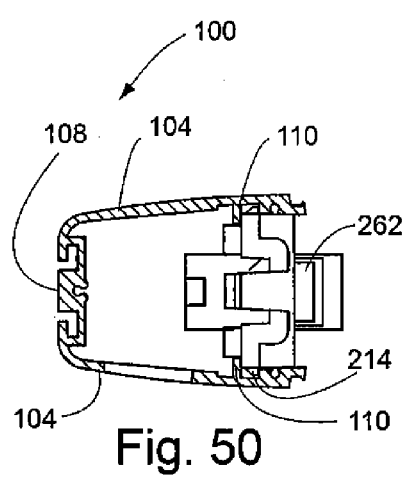
FIG. 50 is a left-side end view of the power data housing channel shown in FIG. 1, with the HDMI receptacle assembly of FIG. 49 slidably inserted into the housing channel.
Figure 51:
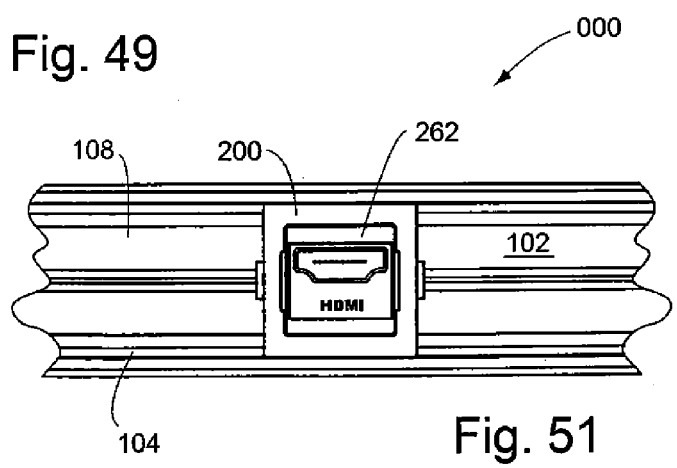
FIG. 51 is a front, elevation view of the HDMI receptacle assembly and housing channel of FIG. 50.

FIGS. 49-51 illustrate a first embodiment of an assembled high definition multi-media interface (HDMI) receptacle assembly consisting of an HDMI receptacle and receptacle housing with the side tabs removed. These are shown as HDMI receptacle assembly 262.

Figure 52:
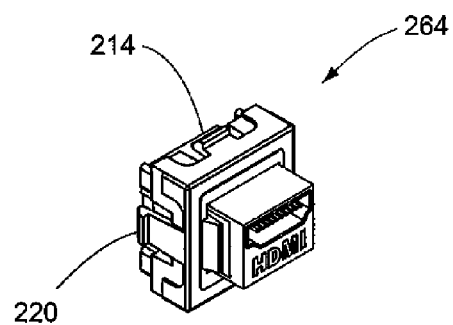
FIG. 52 is a perspective view of a further embodiment of an HDMI receptacle assembly in accordance with the invention.
Figure 53:
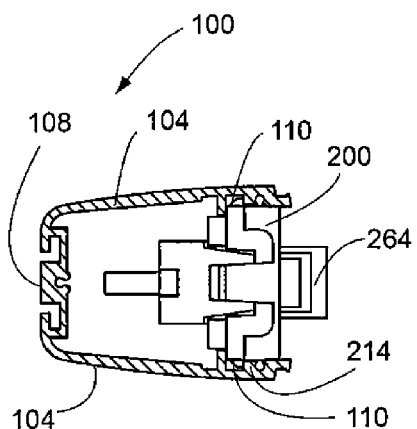
FIG. 53 is a left-side end view of the further embodiment of the HDMI receptacle assembly of FIG. 52, slidably inserted into the housing channel shown in FIG. 1.
Figure 54:
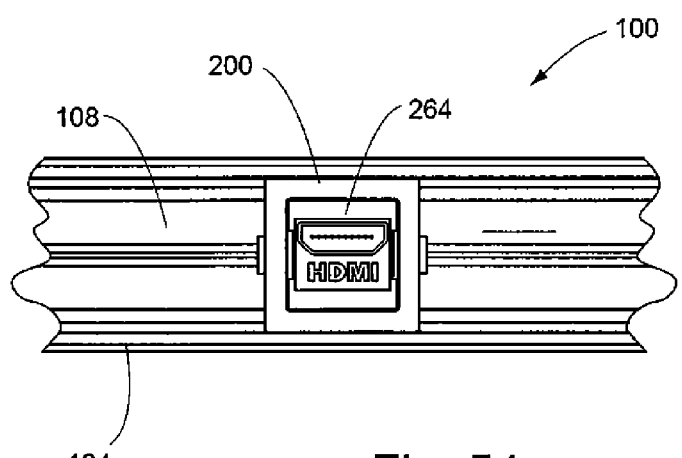
FIG. 54 is a front, elevation view of the HDMI receptacle assembly and housing channel shown in FIG. 53.

FIGS. 52-54 illustrate a second embodiment of a modified HDMI interface 264 as positioned and received within the channel 102.

Figure 55:
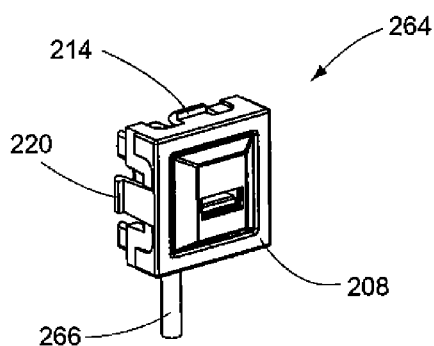
FIG. 55 is a perspective view of a first cable receptacle assembly in accordance with the invention.
Figure 56:
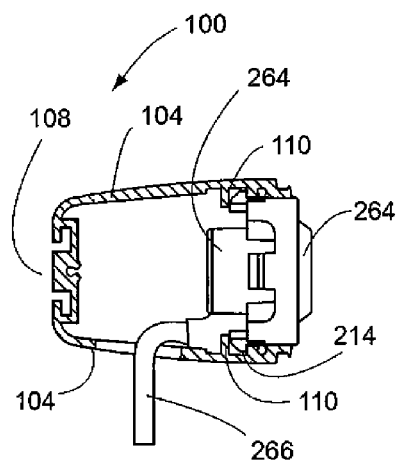
FIG. 56 is a left-side end view of the power data housing channel shown in FIG. 1, with the first cable receptacle assembly of FIG. 55 slidably inserted into the housing channel.
Figure 57:
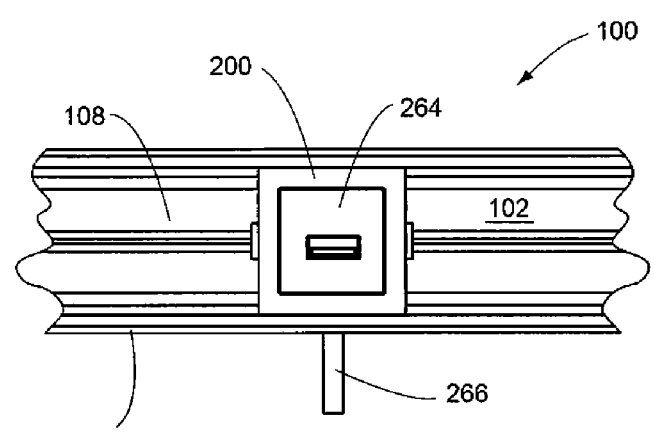
FIG. 57 is a front, elevation view of the first cable receptacle assembly and the housing channel shown in FIG. 56.

FIGS. 55-57 illustrate views showing a first cable receptacle assembly 264 as applied to and received within the channel 102 of the power data housing 100. FIGS. 55-57 also show a cable cord or cable connector 266 as being received through a cord hole 107 (FIG. 56) for appropriate interconnection to external components (not shown).

Figure 58:
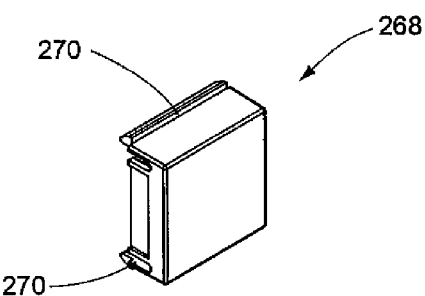
FIG. 58 is a perspective view of a null receptacle assembly in accordance with the invention.
Figure 59:
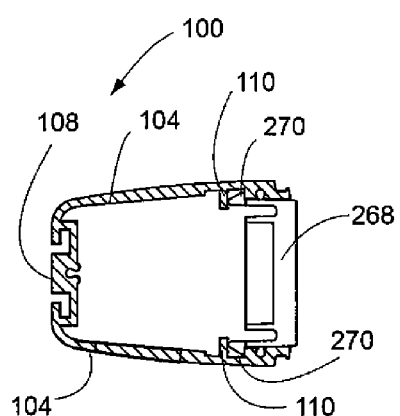
FIG. 59 is a left-side end view of the power data housing channel shown in FIG. 1, with the null receptacle assembly of FIG. 58 slidably inserted into the housing channel.
Figure 60:
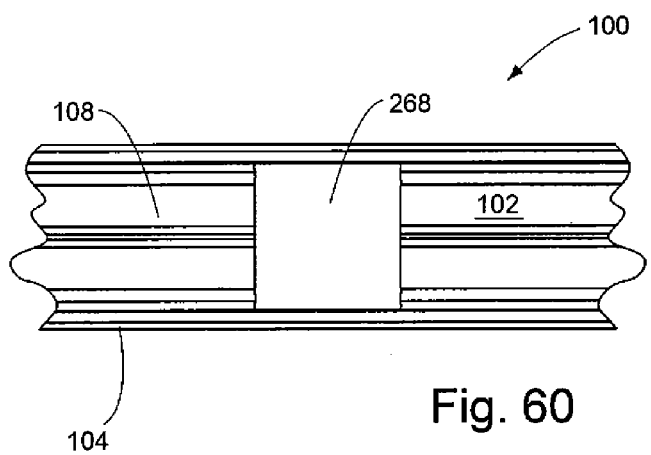
FIG. 60 is a front, elevation view of the null receptacle assembly and housing channel shown in FIG. 59.

FIGS. 58-60 illustrate the use of what is often characterized as a "null" receptacle assembly 268. As shown in FIGS. 58-60, the null receptacle assembly 268 does not necessarily include a receptacle housing, but can include upper and lower tabs 270, which can be received within the opposing upper and lower channels 112 of the power data housing 100.

Figure 61:
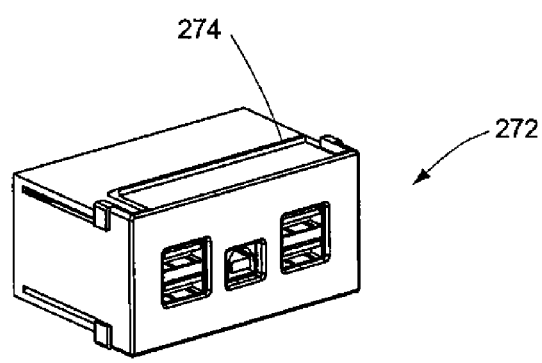
FIG. 61 is a perspective view of a video receptacle assembly in accordance with the invention.
Figure 62:
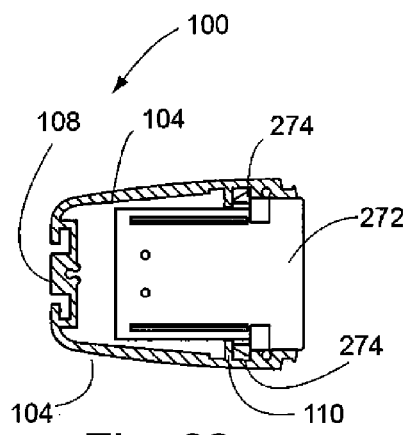
FIG. 62 is a left-side end view of the power data housing channel shown in FIG. 1, with the video receptacle assembly of FIG. 61 as slidably inserted into the housing channel.
Figure 63:
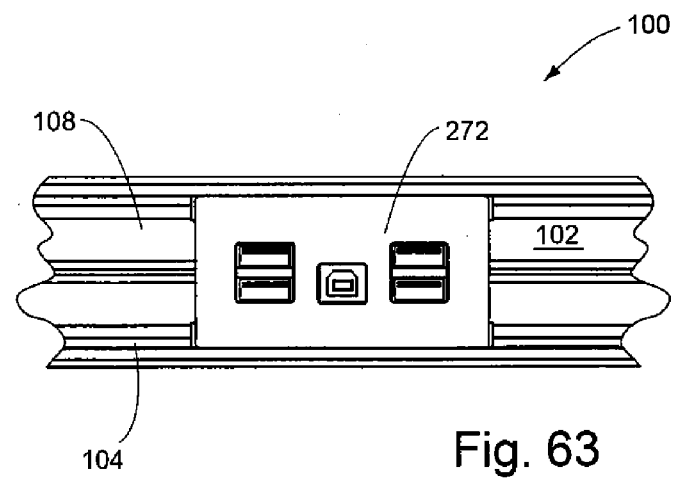
FIG. 63 is a front, elevation view of the video receptacle assembly and housing channel shown in FIG. 62.

FIGS. 61-63 illustrate the application of a video receptacle assembly 272 as the assembly 272 may be applied to the power data housing 100. In this instance, instead of using a receptacle housing, the housing of the video receptacle assembly itself may be used, with opposing upper and lower tabs 274 being received within opposing upper and lower channels 112 of the power data housing 100.

Figure 64:
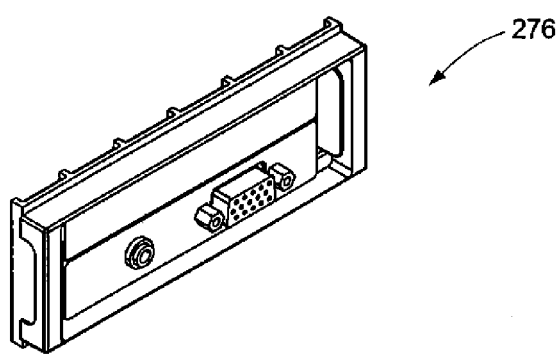
FIG. 64 is a perspective view of a radio assembly in accordance with the invention.
Figure 65:
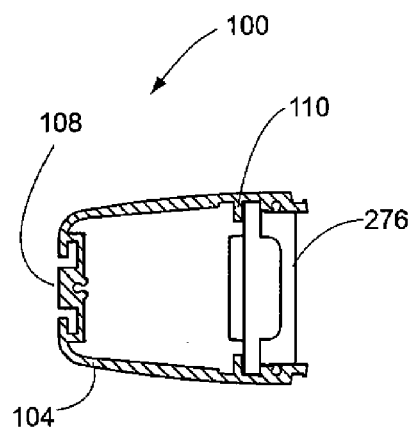
FIG. 65 is a left-side end view of the power data housing channel shown in FIG. 1, with the radio assembly of FIG. 64 slidably inserted into the housing channel.
Figure 66:
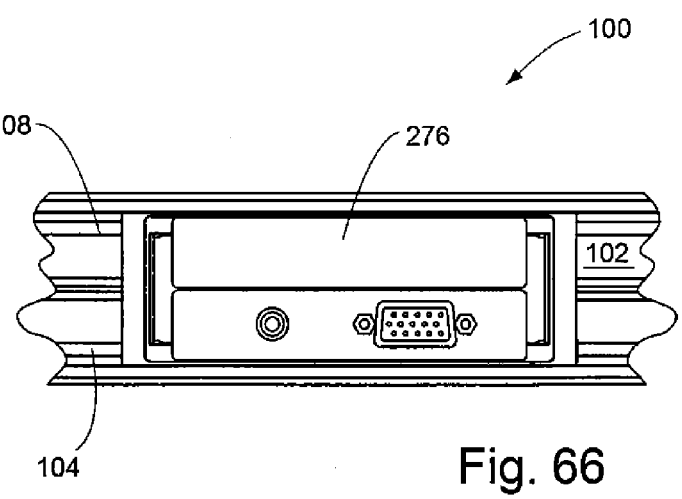
FIG. 66 is a front, elevation view of the radio assembly and housing channel shown in FIG. 65.
Figure 67:
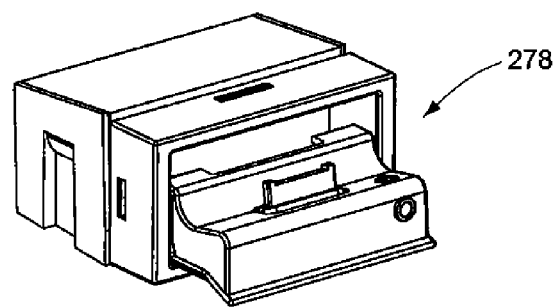
FIG. 67 is a perspective view of a docking station assembly in accordance with the invention.
Figure 68:
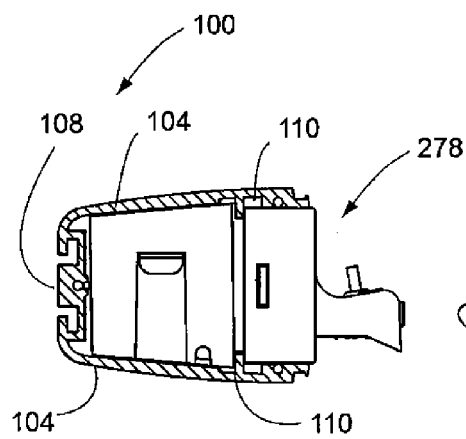
FIG. 68 is a left-side end view of the power data housing channel shown in FIG. 1, with the docking station of FIG. 67 slidably inserted into the housing channel.
Figure 69:
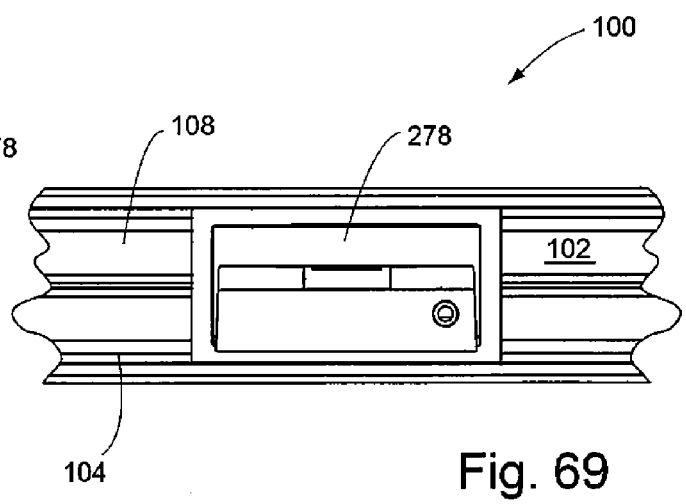
FIG. 69 is a front, elevation view of the docking station and housing channel shown in FIG. 68.
Figure 70:
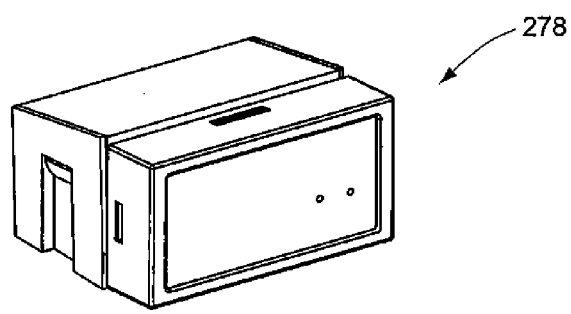
FIG. 70 is a perspective view of the docking station shown in FIG. 67, but showing the docking station in a retracted, closed position.
Figure 71:
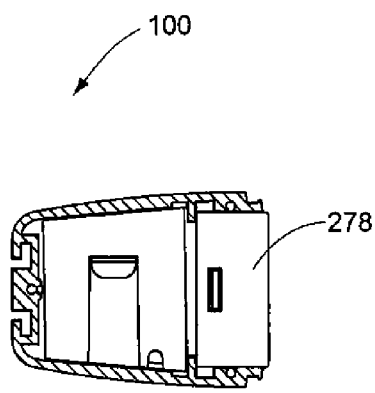
FIG. 71 is a left-side end view of the power data housing channel shown in FIG. 1, with the docking station of FIG. 70 slidably inserted into the housing channel.
Figure 72:
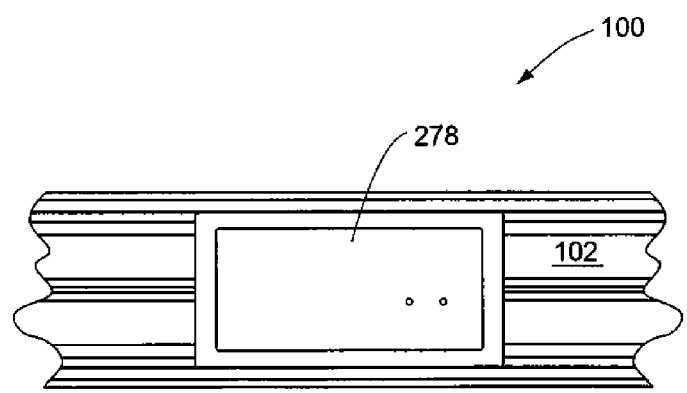
FIG. 72 is a front, elevation view of the docking station and housing channel shown in FIG. 71.

FIGS. 64-66 are views illustrating radio assembly 276 as the assembly 276 may be received within the channel 102. FIGS. 67-69 illustrate a docking station 278 which may be received within the channel 102 of the power data housing 100. FIGS. 70-72 illustrate further views of the docking station 278 shown in FIGS. 67-69, but show the docking station in a retracted, closed position.

Figure 73:
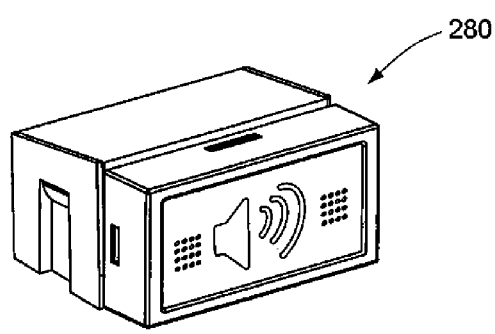
FIG. 73 is a perspective view of a Skype assembly in accordance with the invention.
Figure 74:
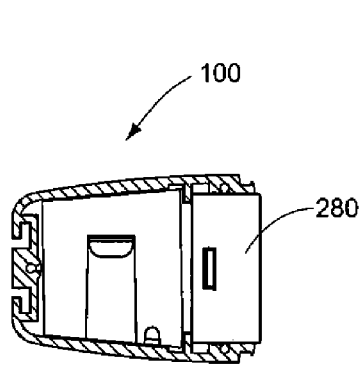
FIG. 74 is a left-side end view of the power data housing channel shown in FIG. 1, with the Skype assembly of FIG. 73 slidably inserted into the housing channel.
Figure 75:
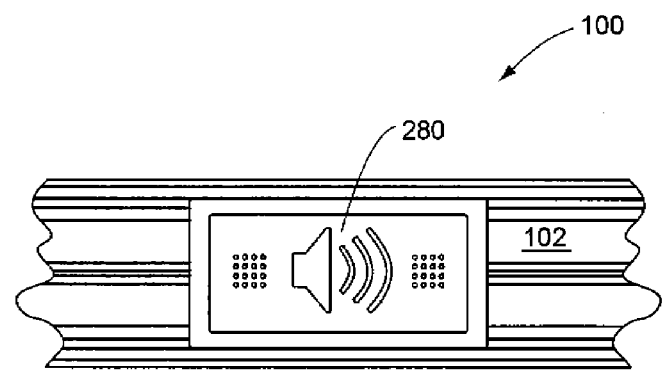
FIG. 75 is a front, elevation view of the Skype assembly and housing channel shown in FIG. 74.

FIGS. 73-75 illustrate a SKYPE assembly 280 which may be assembled and received within the channel 102 of the power data housing 100.

Figure 76:
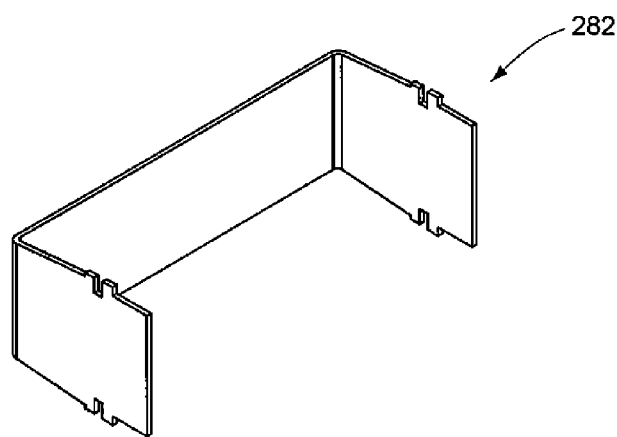
FIG. 76 is an inner housing in accordance with the invention.
Figure 77:
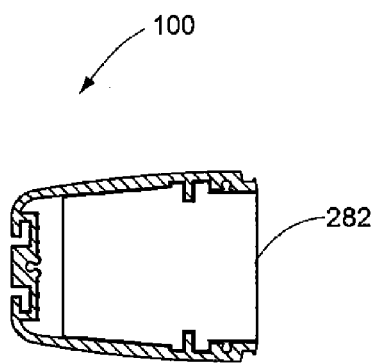
FIG. 77 is a left-side end view of the power data housing channel shown in FIG. 1, with the inner housing of FIG. 76 slidably inserted into the housing channel.
Figure 78:
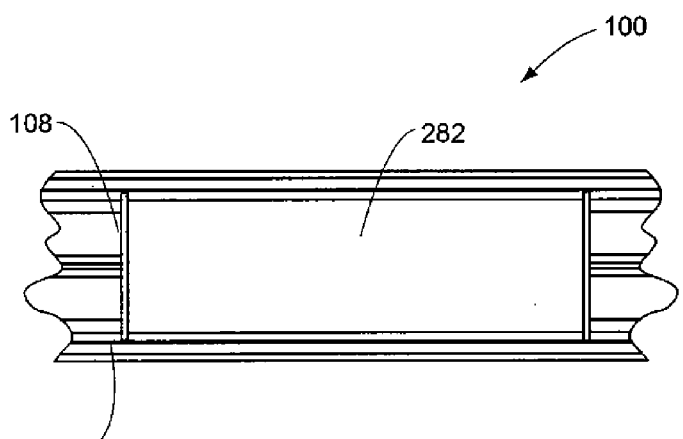
FIG. 78 is a front, elevation view of the inner housing and housing channel shown in FIG. 77.
Figure 79:
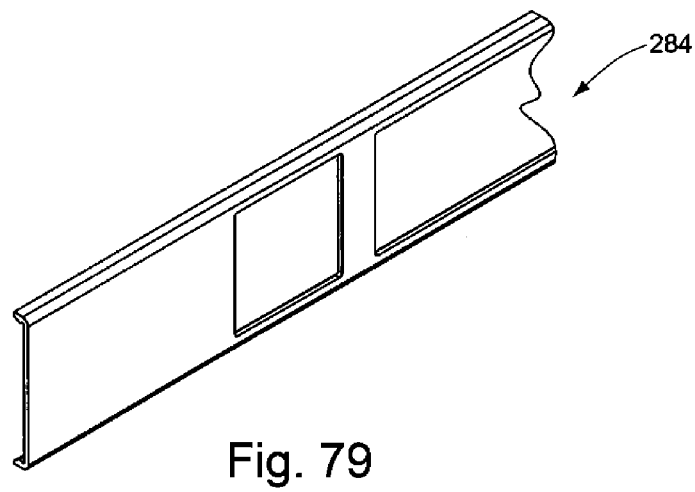
FIG. 79 is a perspective view of a face plate configuration in accordance with the invention.

FIGS. 76-78 illustrate the capability of inserting an inner isolation housing 282 within the channel 102 of the power data housing 100. This isolation channel may be utilized so as to ensure that certain components used with the power data housing 100 are electrically isolated from electromagnetic interference.

Figures 80, 81:
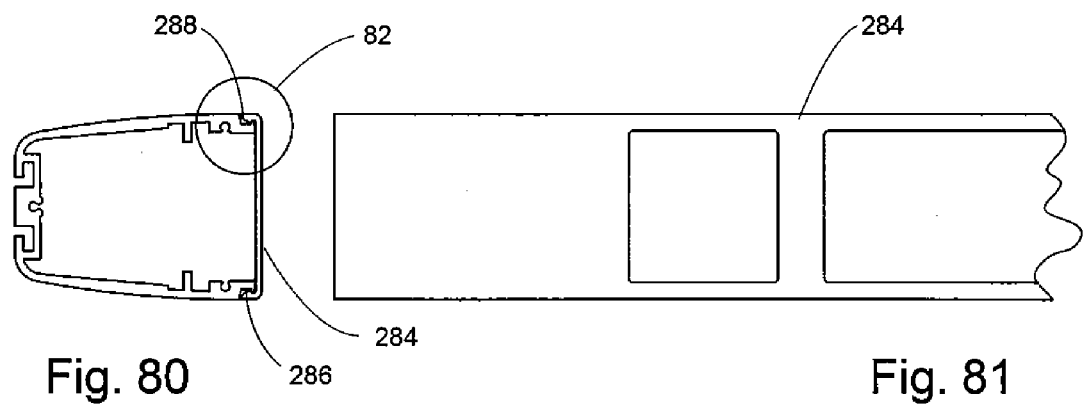
FIG. 80 is a left-side end view of the power data housing channel shown in FIG. 1, with the face plate configuration of FIG. 79 slidably inserted into the front of the housing channel.
FIG. 81 is a front, elevation view of the face plate configuration and housing channel shown in FIG. 80.
Figure 82:
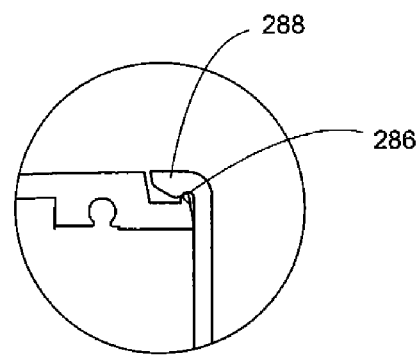
FIG. 82 is an enlarged view of the portion of FIG. 80 identified within circle 82, and showing the upper lip connection of the face plate configuration to the housing channel.

FIGS. 79-82 illustrate a face place configuration 284 which may be utilized within the channel 102. In this regard, FIGS. 80 and 82 illustrate how the face plate configuration 284 may be coupled to the channel 102 through a coupling between upper and lower extending tabs 286 of the channel 102 which are captured within slots 288 formed at upper and lower edges of the face plate configuration 284.

Figure 83:
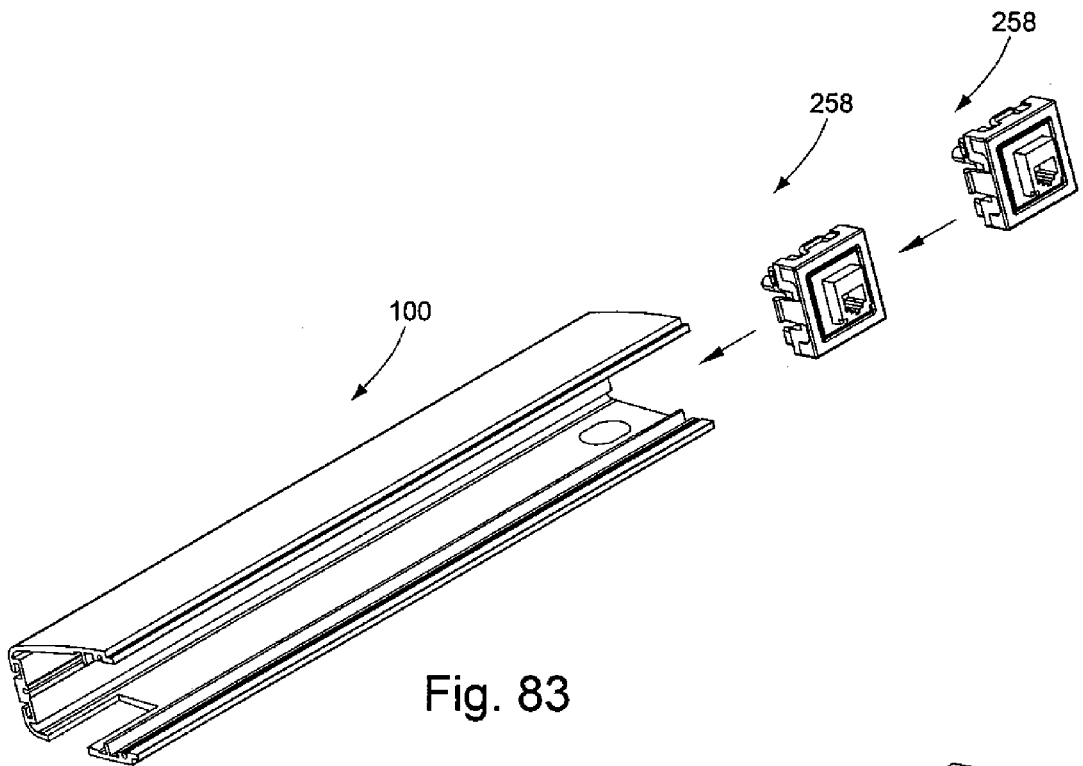
FIG. 83 is a perspective and partially exploded view of the power data housing channel shown in FIG. 1, with a pair of data port assemblies as positioned for being slidably inserted into the housing channel.

FIG. 83 is a perspective and partially exploded view of the power data housing 100 and channel 102 shown in FIG. 1, with a pair of data port assemblies positioned for being slidably received within the housing channel 102.

Figure 84:
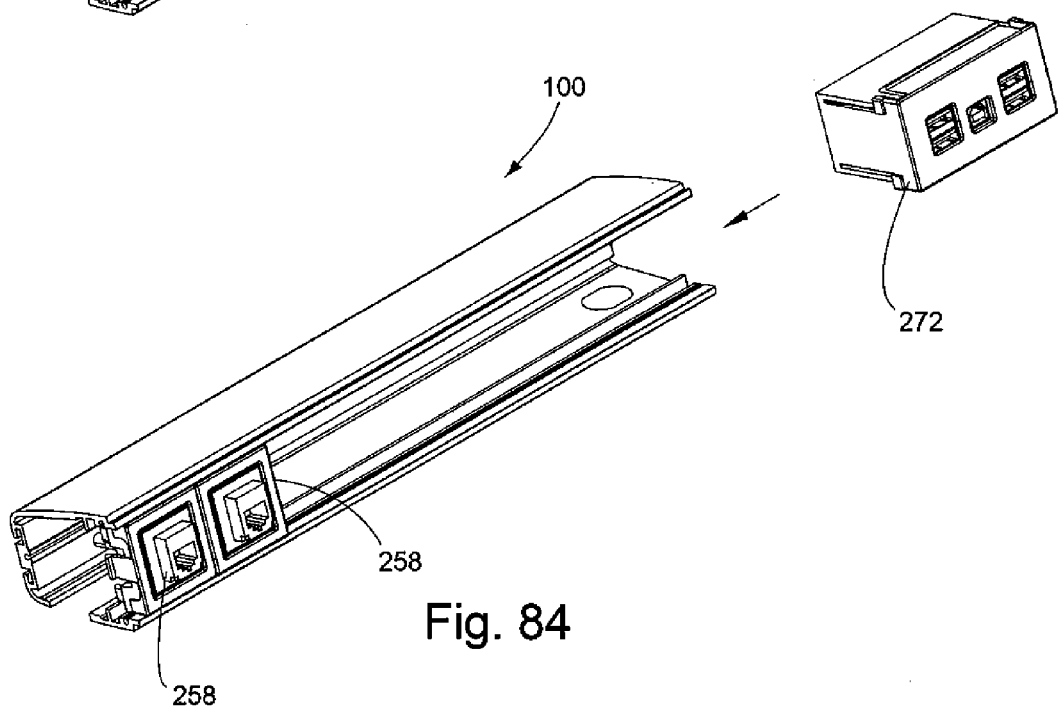
FIG. 84 is a perspective view similar to FIG. 83, but showing the pair of data port assemblies as being inserted within the housing channel, and further showing the relative positioning of the video receptacle assembly as it is to be slidably inserted into the housing channel.
Figure 85:
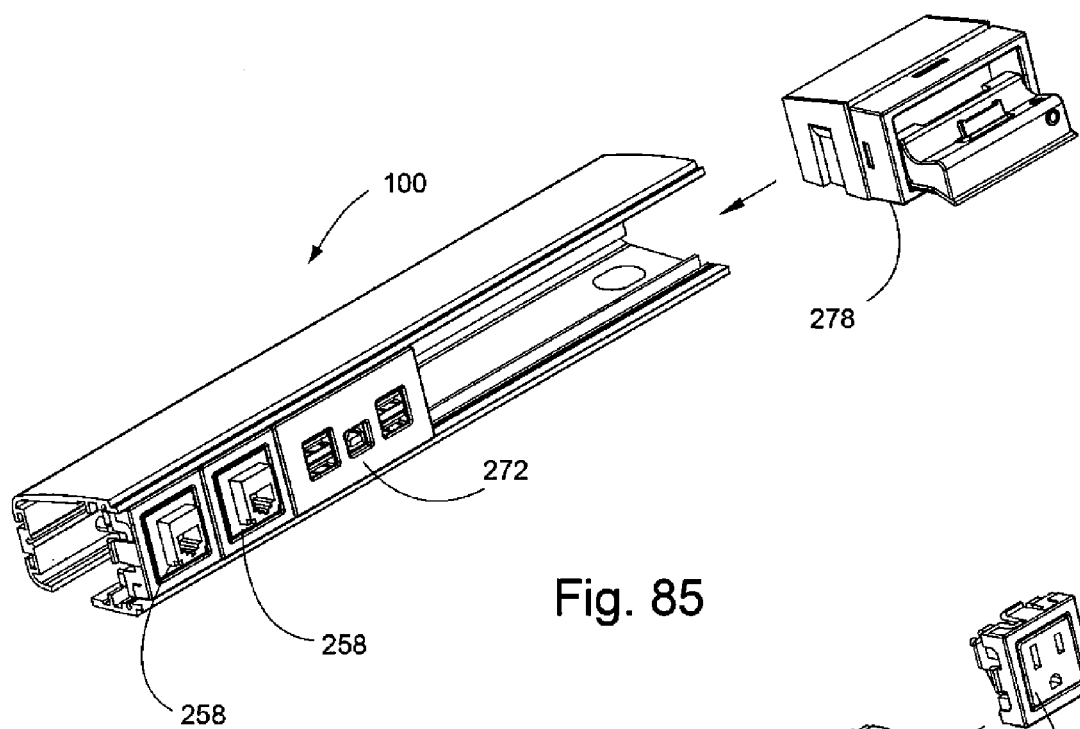
FIG. 85 is a perspective view similar to FIG. 84, but showing the video assembly as being inserted within the housing channel, and further showing the relative positioning of the docketing station for being slidably inserted into the housing channel.

FIG. 84 is a perspective view similar to FIG. 83, but showing a pair of data port assemblies 258 as being inserted within the housing shown in 102, and further showing the relative positioning of the video receptacle assembly 202 as it is to be slidably inserted into the housing channel 102. FIG. 85 is a perspective view similar to FIG. 84, but showing the video assembly 272 as being inserted within the housing channel 102, and further showing the relative positioning of the docking station 278 for being slidably inserted into the housing channel 102.

Figure 86:
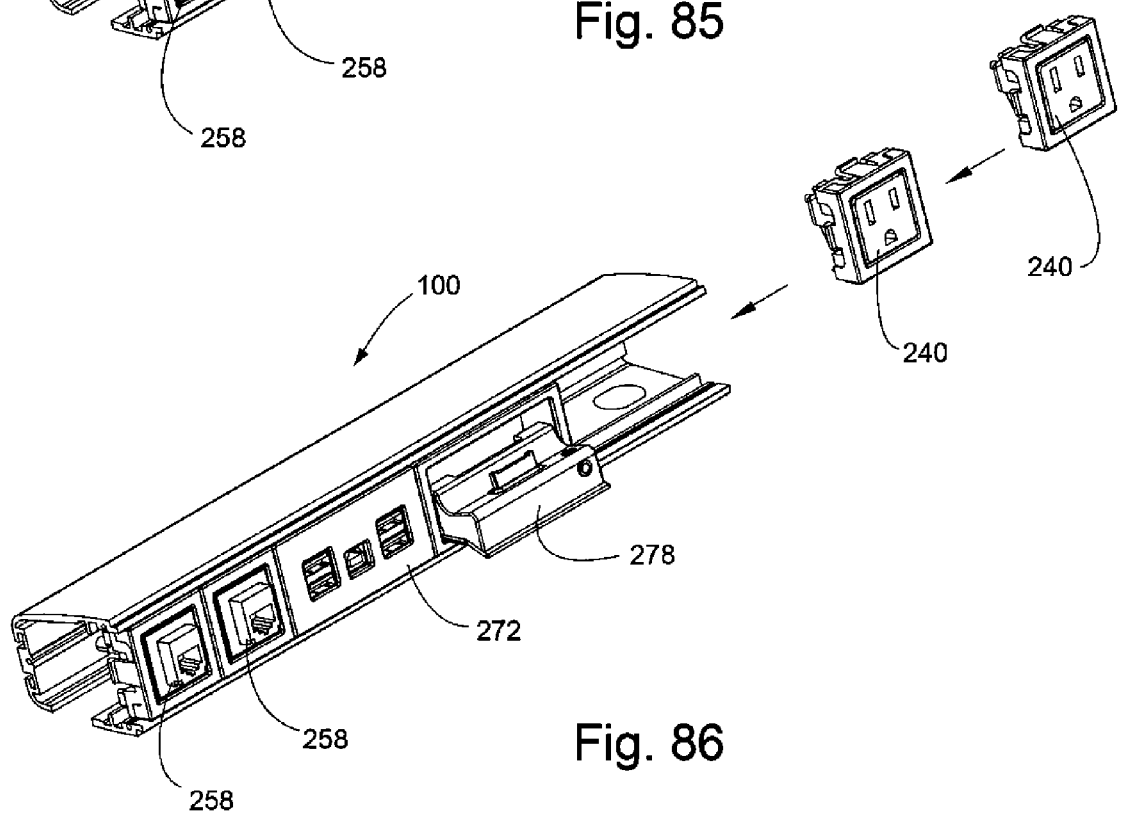
FIG. 86 is a perspective view similar to FIG. 85, but showing the docketing station as being within the housing channel, and further showing the relative positioning of a pair of receptacle assemblies for purposes of being slidably inserted into the housing channel.
Figure 87:
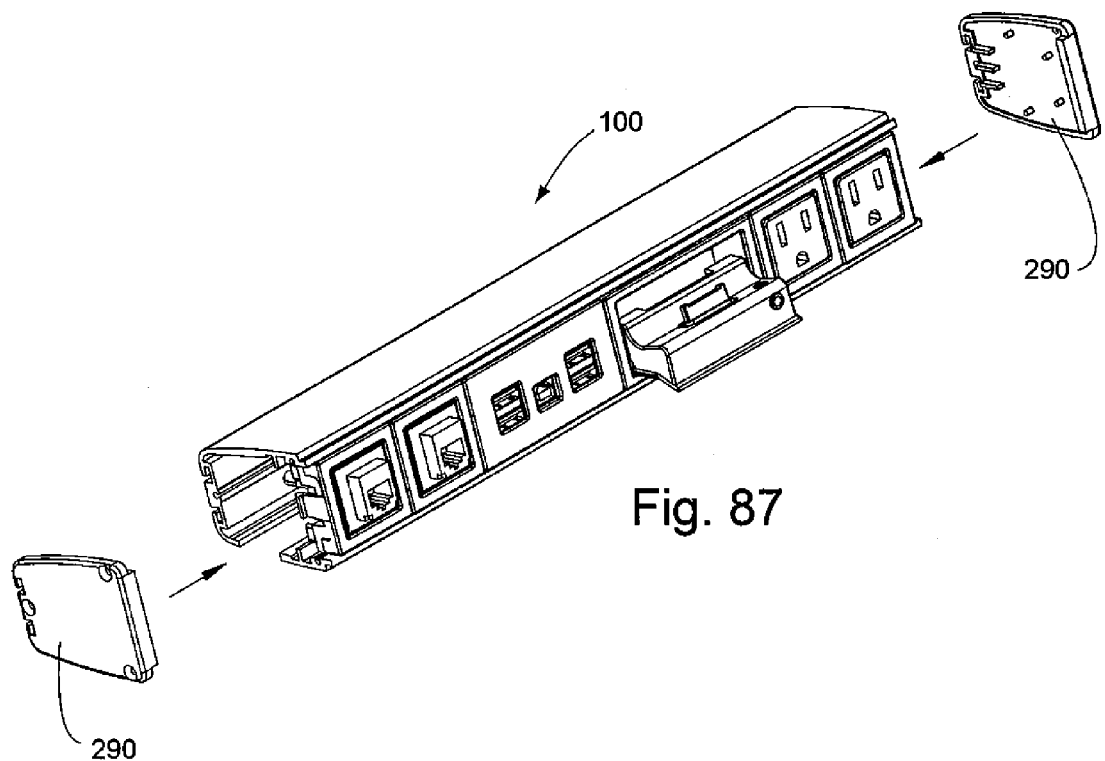
FIG. 87 is a perspective view similar to FIG. 86, but showing the pair of receptacle assemblies as being inserted into the housing channel, and further showing the relative positioning of a pair of opposing side covers for purposes of connection to the housing channel.
Figure 88:
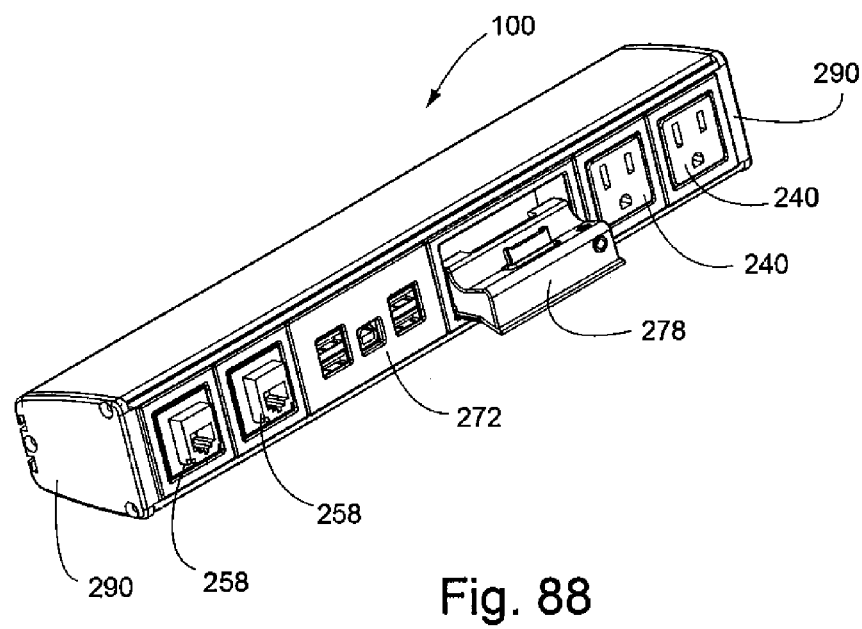
FIG. 88 is a perspective view similar to FIG. 87, but showing the housing channel and side covers in a fully assembled state.
Figure 89:
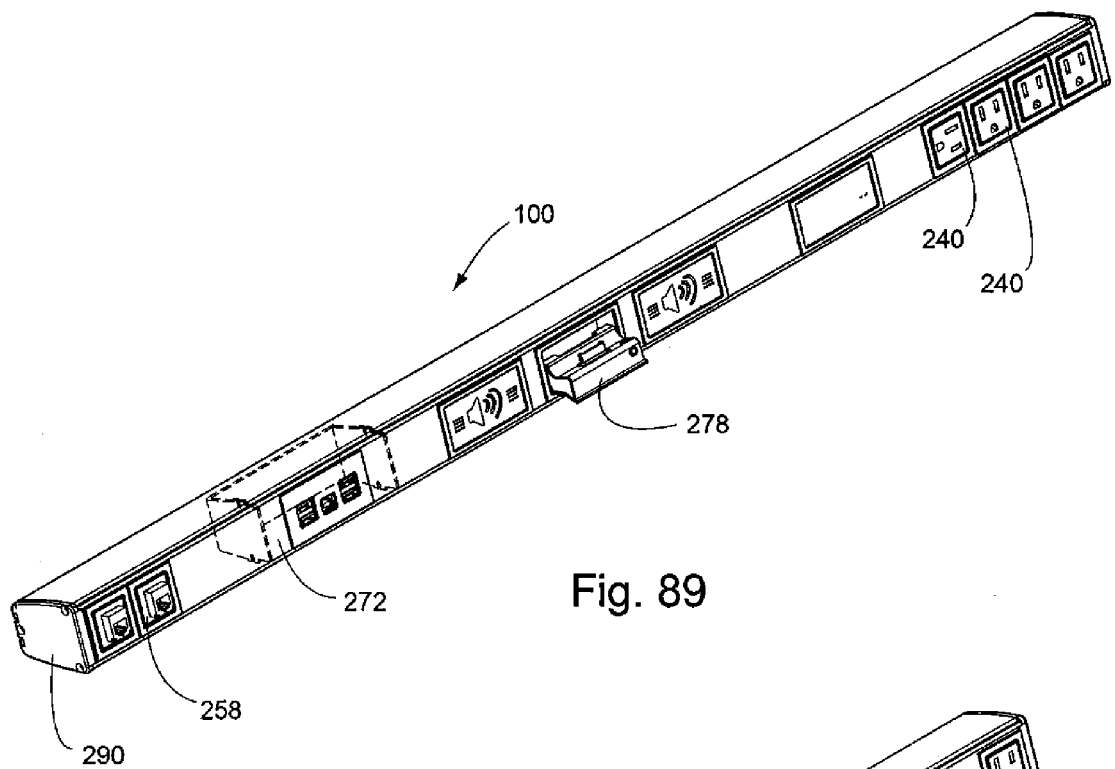
FIG. 89 is a perspective view similar to FIG. 88, but showing a fully assembled housing channel as including a pair of data port assemblies, a face plate configuration, a video configuration, a pair of Skype receptacle assemblies, a docking station, and four receptacle assemblies, with two of the receptacle assemblies being rotated 90.degree. relative to the other two of the receptacle assemblies.

FIG. 86 shows the docking station 278 as being within the housing channel 102, and further shows the relative positioning of a pair of receptacle assemblies 200 for slidably inserting into the housing channel 102. FIG. 87 shows a pair of receptacle assemblies 200 inserted into the channel 102, and further shows the relative positioning of a pair of opposing side covers 290 for purposes of connection to the housing at the outer portions of the channel 102 on the floor section 108. FIG. 89 is a perspective view similar to FIG. 88, but showing a fully assembled housing in channel 102 as including a pair of data port assemblies 258, face plate configuration 284, video receptacle 272, a pair of SKYPE receptacle assemblies 280, a docking station assembly 278, and four receptacle assemblies 200, with two receptacle assemblies being rotated at 90 degrees relative to the other two.

Figure 90:
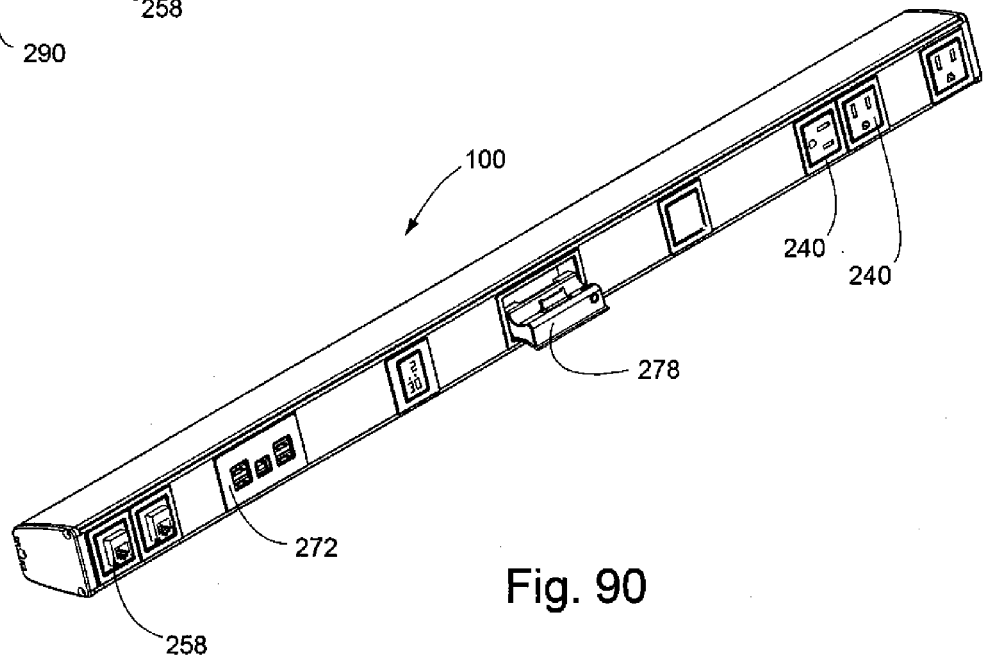
FIG. 90 is a perspective view similar to FIG. 89, but showing a circuit timer and a null assembly positioned within the power data housing channel.

FIG. 90 is a perspective view similar to FIG. 89, but further shows a circuit timer or clock assembly 254, and a null assembly 268 within the channel 102.

FIG. 91 illustrates the use of the power data housing channel 102 with a support bracket 292 in an exploded configuration as the bracket 292 is to be slidably received by the housing channel. It should be noted that the support bracket 292 is supported through components associated with the external portion of the floor section 108. FIGS. 92 and 93 illustrate other views of the support bracket 292 and housing 100. FIG. 94 is an exploded view showing the housing channel 102 with a positioning of a hanging bracket 294 which can be slidably received on the outside of the floor section 108. FIGS. 95 and 96 illustrate other views of the housing 100 with the hanging bracket 294.

Figure 97:
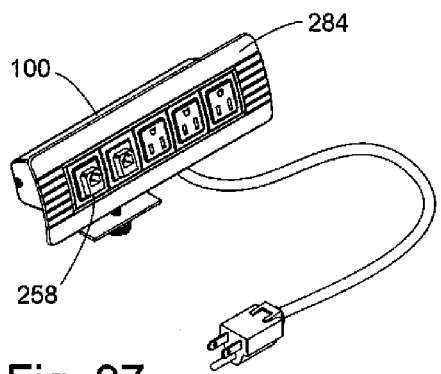
FIG. 97 is a perspective view of the power data housing channel shown in FIG. 1, as the channel may be utilized with an external face plate, having a pair of data port assemblies and three receptacle assemblies.
Figure 98:
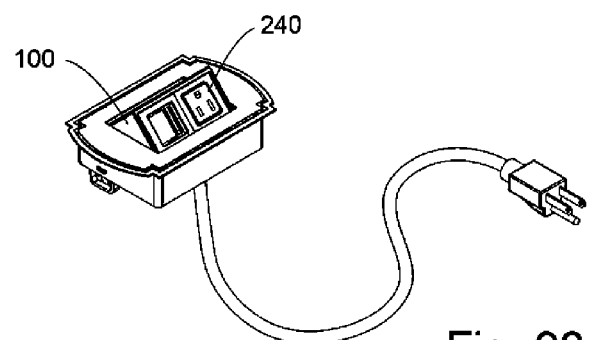
FIG. 98 illustrates a perspective view of the use of a relatively short power data housing channel as used within a power distribution box.
Figure 100:
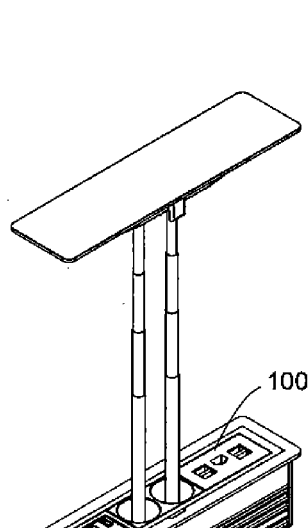
FIG. 100 is a perspective view illustrating the use of the power data housing channel of FIG. 1, with a video receptacle assembly and a pair of simplex receptacle assemblies, as inserted into a work surface light assembly.
Figure 99:
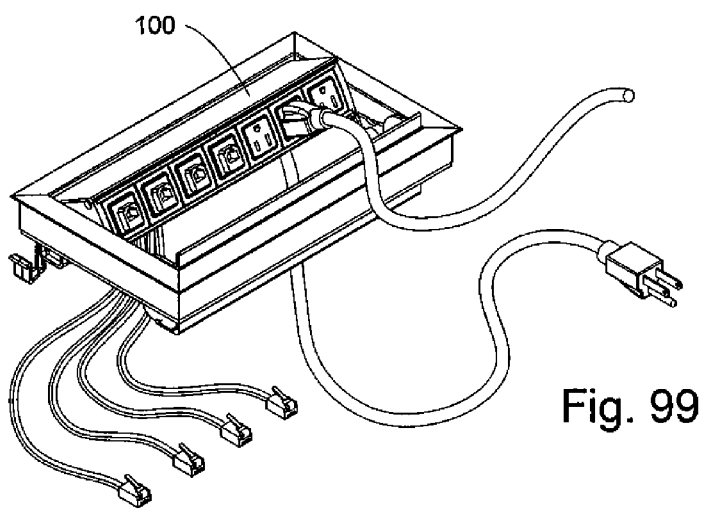
FIG. 99 is a perspective view of the power data housing channel shown in FIG. 1, as the channel may be utilized with a power distribution box somewhat larger than the box shown in FIG. 98.

FIG. 97 is a perspective view of the housing channel 102, as the channel may be utilized with the face plate configuration 284, with data port assemblies and receptacle assemblies. FIG. 98 illustrates the use of a relatively short power data housing with a power distribution box. FIG. 99 illustrates the use of a relatively longer housing and power distribution box. FIG. 100 is a perspective view illustrating the use of the housing channel 102, with a video receptacle assembly and pair of simplex receptacle assemblies, as inserted into a work surface light assembly. Still further, FIG. 101 is a perspective view of the power data housing channel 102, similar to FIG. 99, but showing a somewhat smaller power distribution box than shown in FIG. 99.

It will be apparent to those skilled in the pertinent arts that other embodiments of power data adapter housing in accordance with the invention can be designed. That is, the principles of the invention are not limited to the specific embodiments described herein. Accordingly, it will be apparent to those skilled in the art that modifications and other variations of the above-described illustrative embodiments of the invention may be effected without departing from the spirit and scope of the novel concepts of the invention.

Changes and modifications in the specifically described embodiments may be carried out without departing from the principles of the present invention, which is intended to be limited only by the scope of the appended claims, as interpreted according to the principles of patent law including the doctrine of equivalents.

The embodiments of the invention in which an exclusive property or privilege is claimed are defined as follows:

1. A power data housing configured to receive a plurality of electrical receptacle assemblies, with each of said electrical receptacle assemblies comprising a receptacle housing and a receptacle, said power data housing comprising:

an elongated channel formed with a pair of opposing sides having inner side surfaces, said elongated channel having a substantially constant cross section and a pair of open opposite ends, wherein said elongated channel is configured to be formed to a particular length in order to accommodate one or more of said electrical receptacle assemblies;

a pair of longitudinally extending ribs, each of said ribs formed on a corresponding one of said inner side surfaces of said elongated channel, with said ribs facing each other and partially extending into a spatial area of said channel;

a pair of opposing upper and lower channels defined by said inner side surfaces and facing each other, said opposing upper and lower channels configured to slidably receive structures of said receptacle assemblies, so that said receptacle assemblies can be positioned at any of a number of locations along a continuum of said channel; and a pair of end caps configured to be coupled to respective ones of said open opposite ends of said elongated channel, for closing said opposite ends when said receptacle assemblies are supported at said elongated channel.

2. The power data housing of claim 1, wherein said receptacle assemblies are structured and said opposing upper and lower channels are sized and configured so that said receptacle assemblies can be positionally aligned with said channel in spatial orientations which are 90° of rotation apart from each other.

3. The power data housing of claim 1, wherein at least one of said opposing sides comprises a cord hole for receiving electrical, data and communication cords and cables.

4. The power data housing of claim 1, wherein said housing comprises a second elongated channel having a back-to-back configuration with said elongated channel, and with a floor section forming a common wall between said elongated channel and said second elongated channel.

5. The power data housing of claim 1, wherein each of said opposing sides is curvilinear in structure.

6. The power data housing of claim 1, wherein said power data housing is configured to receive a face plate configuration which is coupled to said channel through a coupling between upper and lower extending tabs of the channel which are captured within slots formed at upper and lower edges of said face plate configuration.

7. The power data housing of claim 1, wherein said elongated channel is configured to be expanded or reduced in size to accommodate different numbers of said electrical receptacle assemblies.

8. The power data housing of claim 1, wherein said elongated channel and said end caps cooperate to define a carriage, which is pivotally coupled to a stationary housing configured for mounting to a work surface.

9. The power data housing of claim 1, further in combination with said plurality of electrical receptacle assemblies, each of said electrical receptacle assemblies comprising a receptacle housing and a receptacle mounted in said receptacle housing.

10. The power data housing of claim 1, wherein each of said opposing sides is integral with or otherwise connected together with a floor section.

11. The power data housing of claim 10, wherein said floor section of said power data housing is slidably coupled to a support bracket, with said support bracket having supports for slidably engaging an external portion of said floor section.

12. The power data housing of claim 10, wherein said power data housing is coupled to a hanging bracket for purposes of hanging said power data housing on a vertical surface, with said hanging bracket being slidably received on an outside of said floor section.

13. The power data housing of claim 1, wherein at least one of said receptacle housings is coupled to an electrical outlet receptacle, and said at least one of said receptacle housings and said outlet receptacle are slidably received within said elongated channel.

14. The power data housing of claim 13, wherein said at least one of said receptacle housings is configured to be released from the coupling to said electrical receptacle, and comprises a data port insert for coupling data ports and other communications receptacles to said at least one of said receptacle housings.

15. The power data housing of claim 13, wherein said receptacle received within said at least one of said receptacle housings comprises a Type B receptacle.

16. The power data housing of claim 13, wherein said channel receives a plurality of receptacle housings and receptacles, with said receptacle housings and said receptacles comprising at least one receptacle housing with an electrical outlet receptacle therein, at least one receptacle housing with a data port received therein, a high definition multi-media interface receptacle, a video receptacle, and a docking station for charging hand-held electrical components.

17. A power data housing configured to support one or more electrical receptacle assemblies comprising a receptacle housing and a receptacle, said power data housing comprising:

an extruded and generally C-shaped housing body having opposite open ends and a substantially constant cross section between said open ends, said housing body further having a pair of opposing upper and lower sides joined by a floor section, and with inner side surfaces of said upper and lower sides and said floor section cooperating to define an elongated channel;

at least one longitudinally-extending rib defined by each of said inner side surfaces of said upper and lower sides, said ribs projecting into said elongated channel, a pair of opposing upper and lower channels defined by respective ones of said inner side surfaces of said upper and lower sides, wherein said opposing upper and lower channels are configured to slidably receive respective outer portions of said receptacle housings of said receptacle assemblies, whereby said receptacle assemblies are positionable in said elongated channel at a plurality of locations therealong;

a pair of end caps configured to be coupled to respective ones of said opposite open ends of said housing body, said end caps configured to close said opposite open ends with one or more of said receptacle assemblies disposed in said elongated channel and supported by said upper and lower sides of said housing body; and wherein said housing body is configured to be formed to a particular length in order to accommodate one or more of said electrical receptacle assemblies or different types of said receptacle assemblies.

18. The power data housing of claim 17, wherein at least one of said opposing sides of said housing body defines an opening through which electrical cords that are associated with said receptacle assemblies are directed out of said elongated channel.

19. The power data housing of claim 17, further in combination with a mounting bracket, wherein said mounting bracket comprises a first interlocking portion and said floor section of said housing body comprises a second interlocking portion configured for interlocking engagement with said first interlocking portion, whereby said mounting bracket is securable to said housing body via sliding interlocking engagement of said first and second interlocking portions.

20. The power data housing of claim 17, wherein said one or more electrical receptacle assemblies comprise at least two chosen from (i) a data port, (ii) a simplex electrical receptacle assembly, (iii) a video receptacle assembly, (iv) a docking station for a portable electronic device, (v) a circuit timer, (vi) a clock, (vii) a radio assembly, and (viii) a light assembly.

21. The power data housing of claim 17, wherein said one or more electrical receptacle assemblies comprise at least three chosen from (i) a data port, (ii) a simplex electrical receptacle assembly, (iii) a video receptacle assembly, (iv) a docking station for a portable electronic device, (v) a circuit timer, (vi) a clock, (vii) a radio assembly, and (viii) a light assembly.

22. The power data housing of claim 17, further in combination with said plurality of electrical receptacle assemblies, each of said electrical receptacle assemblies comprising a receptacle housing and a receptacle mounted in said receptacle housing.

\* \* \* \* \*